350-96.14 SR
6/17/86 XR 4,595,994

United States Patent [19]
Verber et al.
[11] Patent Number: 4,595,994
[45] Date of Patent: Jun. 17, 1986

[54] OPTICAL ENGAGEMENT ARRAY MULTIPLICATION

[75] Inventors: Carl M. Verber; Richard P. Kenan, both of Columbus, Ohio

[73] Assignee: Battelle Memorial Institute, Columbus, Ohio

[21] Appl. No.: 573,528

[22] Filed: Jan. 25, 1984

Related U.S. Application Data

[63] Continuation-in-part of Ser. No. 481,184, Apr. 1, 1983, abandoned.

[51] Int. Cl.[4] .......................... G06G 9/00; G06G 7/16; G02B 6/10

[52] U.S. Cl. .................................... 364/841; 364/845; 350/96.14

[58] Field of Search ............... 364/800, 807, 841, 845, 364/606, 713; 350/162.11, 162.12, 400–406, 96.12, 96.13, 96.14

[56] References Cited

U.S. PATENT DOCUMENTS

| | | | |
|---|---|---|---|
| 3,305,669 | 2/1967 | Fan | 364/845 X |
| 4,094,581 | 6/1978 | Baldwin et al. | 350/406 X |
| 4,156,284 | 5/1979 | Engeler | 364/841 X |
| 4,468,093 | 8/1984 | Brown | 350/162.12 |

OTHER PUBLICATIONS

H. J. Caulfield et al., "Optical Implementation of Systolic Array Processing", *Optics Communications,* vol. 40, No. 2 pp. 86–90, Dec. 15, 1981.

*Primary Examiner*—Gary V. Harkcom
*Attorney, Agent, or Firm*—Philip M. Dunson

[57] ABSTRACT

Method and apparatus provide a series of optical analog intensities that are approximately proportional respectively to the components of a third array that is the product of a first array of components multiplied by a second array of components in a predetermined order. A laser (127) and collimating lens (128) (FIG. 5) direct input light (111) to a first set of electrooptic modulator (118) each of whose output light intensity varies with an electrical signal applied to it serially by electronic circuitry (129) (FIG. 12) for each respective component of the first array. A waveguide (130) directs output light from each first modulator (118) to a respective second electrooptic modulator (123), similar to the first, and similarly controlled by electronic circuitry (131) for the second array. The intensity of the output light from each second modulator (123) is responsive to the product of its two respective components. An imaging lens (132) directs the output light (115) from each second modulator (123) to a respective detector in the set (133), providing an electrical signal responsive to the product of its two components.

24 Claims, 14 Drawing Figures

OPTICAL ENGAGEMENT ARRAY MULTIPLICATION

The Government has rights in this invention pursuant to Contract No. F49620-79-C-0044 award by Air Force Office of Scientific Research.

This application is a continuation in part of the copending U.S. patent application of Carl M. Verber and Richard P. Kenan for Array Multiplication; Ser. No. 481,184 filed Aril 1, 1983; assigned to the assignee of the present application; and now abandoned.

FIELD

This invention relates to engagement array processing with optical methods and apparatus. It is especially useful for computations involving multiplication of a vector by a matrix and for computations involving multiplication of a matrix by a matrix.

The present invention is related also to the subject matter of the following U.S. patents and copending U.S. patent applications:

A. Richard P. Kenan and Carl M. Verber, Electrooptical Multipliers;
U.S. Pat. No. 4,403,833, Sept. 13, 1983.

B. Carl M. Verber and Richard P. Kenan, Controlling Light;
U.S. Pat. No. 4,415,226, Nov. 15, 1983.

C. Richard P. Kenan and Carl M. Verber; Electrooptical Comparators;
Ser. No. 344,116, filed Jan. 29, 1982.
Now U.S. Pat. No. 4,561,718, issued Dec. 31, 1985.

D. Henry John Caulfield, Systolic Array Processing;
Ser. No. 450,153, filed Dec. 15, 1982.
Now U.S. Pat. No. 4,567,569, issued Jan. 28, 1986.

E. H.J. Caulfield, Polynomial Evaluation;
Ser. No. 459,168, filed Jan. 19, 1983.
Now U.S. Pat. No. 4,544,230, issued Oct. 1, 1985.

F. Carl M. Verber, Optical Computation;
Ser. No. 459,167, filed Jan. 19, 1983.
Now U.S. Pat. No. 4,544,229, issued Oct. 1, 1985.

G. Carl M. Verber, B. Thomas Smith, and Philip M. Dunson, D/A Conversion;
Ser. No. 555,242, filed Nov. 25, 1983.

Said patents and applications are assigned to the assignee of the present invention. To the extent that any subject matter disclosed or claimed in the present application may be considered to be disclosed in, or obvious from, any copending application of the present inventors cited above, the benefit of the filing date of the copending application is hereby claimed for such subject matter under 35 USC 120. All of the patents and applications cited above are hereby incorporated hereinto by reference and made a part hereof the same as if fully set forth herein.

BACKGROUND

Except where otherwise indicated herein, the electrooptic components employed in typical embodiments of the present invention are now well known. Convenient ways of making them are described in the above mentioned patents and applications and in the references cited therein and herein.

The terms "reflect", "reflective", etc. are used herein broadly to relate to any changing of direction or bending of the general type commonly provided by mirrors, gratings, beam splitters, and the like. In the Bragg gratings and beam splitters employed in typical embodiments of the present invention, the reflections are of course provided by the phenomenon more particularly called diffraction. So the words "reflection" and "diffraction", and their corresponding verbs, adjectives, etc., can be considered to be substantially synonyms as used herein, especially in describing and defining typical features of the invention.

The term "IOC" is used herein as an acronym for "integrated optical circuit". "SAW" is an acronym for "surface acoustical wave". "IOSLM" is an acronym for "integrated optical spatial light modulator". "VLSI" means "very large scale integration". "PISO" means "parallel in, serial out". "SIPO" means "serial in, parallel out". "D/A" means "digital to analog (converter)".

The disclosure in the December 1982 copending application for Systolic Array Processing includes the paper by H.J. Caulfield, et al[8] wherein it is shown how certain algorithms for matrix-vector multiplication can be implemented using acoustooptic cells for mulitplication and input data transfer and using CCD (change coupled device) detector arrays for accumulation and output of the results. No 2-D matrix mask is required; matrix changes are implemented electronically. A system for multiplying a 50-component nonnegative-real matrix is described. Modifications for bipolar-real and complex-valued processing are possible, as are extensions to matrix-matrix multiplication and multiplication of a vector by multiple matrices.

During the last several years, Kung and Leiserson at Carnegie-Mellon University[1,9] have developed a new type of computational architecture which they call "systolic array processing". Although there are numerous architectures for systolic array processing, a general feature is a flow of data through similar or identical arithmetic or logic units where fixed operations, such as multiplications and additions, are performed. The data tend to flow in a pulsating manner, hence the name "systolic". Systolic array processors appear to offer certain design and speed advantages for VLSI implementation over previous calculational algorithms for such operations as matrixvector multiplication, matrix-matrix multiplication, pattern recognition in context, and digital filtering.

The December 1982 application deals with improving systolic array processors by using optical input and output as well as new architectures for optical signal processing, particularly for multiplications involving at least one matrix; and it points out that many other operations can be performed in an analogous manner.

The following disclosure includes, with slight revision, relevant portions of the paper by C.M. Verber and R.P. Kenan, "Integrated Optical Circuits for Numerical Computation"; in Integrated Optics III, Proc. SPIE, vol. 408, 1983, pp. 57–64. (Paper Number408–10 of the SPIE (Society of Photo-Optical Instrumentation Engineers)), SPIE's Technical Symposium East '83, held in Arlington, Va., April 4–8, 1983; presented there orally on April 5, 1983.) In the paper, recent developments in the design of integrated optical circuits for performing optical numerical computations are discussed. The use of systolic architectures for these IOC's is described and the natural marriage of IOC's with the systolic concept is discussed. Examples include optical binary correlation, polynomial evaluation, and matrix multiplication.

There has recently been an increasing interest in the application of optical techniques to the solution of a variety of computational problems. The reasons most commonly cited for this interest are the high processing speeds and the low power consumption which are potential characteristics of optical analog devices, especially if the problem and the algorithm are well chosen.

The approach to computer design known as systolic array architecture was developed by Kung[1] and others as a method of approaching the problem of VLSI computer design. The basic guidelines are:

a. Each datum should be fetched from memory only once to avoid the "von Neuman bottleneck".

b. Each chip should contain only a small number of different processor subunits, although these subunits may be repeated many times on each chip.

c. Connections between subunits should be only to nearest neighbors to facilitate the rapid flow of data and to simplify fabrication.

We would be hard pressed to compile a better list of design guidelines for integrated optical circuits (IOCs).

a. We do not yet have available an optically addressable memory for IOCs, although some of Nishihara's[2] surface holograms may be adaptable for this purpose. It is therefore essential that the recourse to memory be minimized since the act of fetching data from a digital store is much slower than the rate at which the IOC is capable of using that data.

b. At this stage in the development of IOC technology, we have only a small number of operational building blocks available to us. The second guideline is therefore compatible with IOC technology, if only by default.

c. The third guideline is perhaps not as important for optical as for electronic systems since it is possible to have optical carriers intersect in either planar or in channel[3] configurations without causing significant crosstalk. Complex interconnection schemes can therefore be implemented without requiring a multilayer structure. However, since the progress of the data through an optical processor is controlled by the speed of light in the device and not by a digital clock, it is necessary to pay attention to path lengths in high-speed devices to assure that proper synchronism of the data flow is maintained.

There are several obvious advantages to using integrated as opposed to bulk optical techniques for the implementation of high-speed computational algorithms. Perhaps the most important is that a variety of high-speed integrated-optical modulators[4] and switches[5] have already been developed and that these require electrical drive signals which are several orders of magnitude less than comparable bulk components. In addition, the integrated systems tend to be more compact than conventional optical systems and lend themselves to mass production by more or less conventional photolithographic techniques. A major shortcoming of the IOCs is that they are not capable of the same flexibility in handling two-dimensional computations as are the bulk devices. A hybrid approach seems to be the solution to this problem.

The devices to be described rely heavily on the use of electrooptically induced gratings. Such gratings are generated via the electrooptic effect using the fringing field from a set of interdigital surface electrodes. The basic electrode structure is illustrated in FIG. 1. The electric field immediately below the electrodes is normal to the waveguides surface, and at the surface in the gap it is tangential to the waveguide surface. Both of these fields are periodic with period equal to four line widths (if the line and gap widths are the same). The amplitudes of the index variations induced by the two fields are not, however, equal because they generally invoke different electrooptic coefficients. The net effect of the electrode configuration is to produce a complicated index profile. The fields, to which the refractive index variations are proportional, have been given by Engan[6] in a Fourier series; for our uses, only the fundamental component is important. The presence of two fields causes the index pattern to be shifted relative to the electrode structure, that is, the maximum of the index modulation does not occur at the centers of the gaps or of the electrode lines, but is displaced somewhat.

The induced gratings can be operated at high efficiency, if desired, using low voltages. A typical result is 95% efficiency at voltages of 4–10 volts for a grating with electrode lines 2 mm long and a period of 8–15 $\mu$m. The diffraction efficiency of a grating having many fingers appears to follow Kogelnik's[7] theory in form, but typically does not reach 100% efficiency. The reason for this may be the incomplete overlap of the electric field with the optical field because of the exponential decay of the former with depth into the waveguide. Finally, we mention that the capacitance of the surface electrodes on y-cut $LiNbO_3$ is about 0.5 pf/mm of finger length/finger pair, or 1 pf/finger pair for 2 mm long fingers.

Electrooptic gratings are capable of performing simple arithmetic (or logic) operations on analog (or binary) voltage signals. The simplest such operation is performed using the basic element pictured in FIG. 1. The diffracted light beam has intensity equal to $\eta \times I_o$, and $\eta$ is determined by the voltage difference between the two electrodes. For binary (two-level) signals, the result is the exclusive OR (EXOR) logic operation. For analog voltages, the result is a nonlinear function of the voltages, but for small signals, it is proportional to $(V_1 - V_2)^2$, the square of the voltage difference.

To multiply two signals together, we use the "herringbone" structure shown in FIG. 2. This is essentially two grating-inducing electrode systems using slanted fingers and placed so that the output of the first is the input to the second. In FIG. 2, the gratings share one electrical lead, the ground, but this is not required. The output here is the input intensity multiplied by the product of the efficiencies of the two gratings. Again, because the grating response is nonlinear in the voltages, some arrangement must be used to linearize the device.

DISCLOSURE

Typical methods and apparatus according to the present invention for providing a series of optical analog intensities that are approximately proportional respectively to the components of a third array that is the product of a first array of components multiplied by a second array of components in a predetermined order, comprise the steps of, and means for, directing light of selected intensity to the input side of each of a first set of modulating means each of whose output light intensity is approximately proportional to a known function of an electrical signal applied to it, applying to each of the first set of modulating means, while the light is passing through it, a signal approximately proportional to a function of a selected respective component of the first array such that the intensity of the output light from each of the first set of modulating means is approximately proportional to a known function of its selected respective component;

directing the output light from each of the first set of modulating means to the input side of a respective one of a second set of modulating means whose output light intensity is approximately proportional to a known function of an electrical signal applied to it, applying to each of the second set of modulating means, while the light is passing through it, a signal approximately proportional to a function of a selected respective component of the second array such that the intensity of the output light from each of the second set of modulating means is approximately proportional to a known function of the product of its two selected respective components, directing the output light from each of the second set of modulating means to a respective means responsive thereto for providing an electrical signal that is approximately proportional to a known function of the product of its two selected respective components;

then, after a predetermined time, applying to each modulating means in each set, while the light is passing through it, a signal approximately proportional to a function of another selected respective component of its respective array such that the intensity of the output light from each of the second set of modulating means is approximately proportional to a known function of the product of its two selected respective components;

and so on, in the same manner, and finally with the last of the selected respective components of the first array and the last of the selected respective components of the second array, to provide an electrical signal that is approximately proportional to a known function of the product of each pair of selected respective components, and appropriately directing the individual product signals into a plurality of data processing means each of which provides an output that is approximately proportional to an appropriate component of the third (product) array.

The means for directing light to the first set of modulating means typically comprises a laser and collimating means.

Typically the first set of modulating means comprises a first plurality of integrated optical spatial light modulators, and the second set of modulating means comprises a second plurality of integrated optical spatial light modulators similar to those in the first set. The means for directing the output light typically comprises an imaging lens, and may comprise also means for preventing light other than the output light from reaching the means responsive thereto. Typically the preventing means comprises opaque blocking means having an opening located to pass only the output light.

Typically the means for applying first signals to the first set of modulating means comprises first means for receiving a plurality of electrical signals and for applying them in a predetermined sequence to the first set of modulating means. The first signal applying means typically comprises a plurality of digital registers, first means for receiving digital signals from the registers and transmitting them serially to first means for converting them to analog signals, and first means for applying the analog signals to the first set of modulating means. Typically the means for applying second signals to the second set of modulating means comprises second means, similar to the first, for receiving a plurality of electrical signals and for applying them in a predetermined sequence to the second set of modulating means.

Typically each data processing means comprises means for providing an output responsive to the sum of a selected plurality of individual product signals, such as photodetector means and capacitive means for accumulating an electrical charge and thus integrating the output of the photodetector means over an appropriate time.

DRAWINGS

CARRYING OUT THE INVENTION

Figure 2:
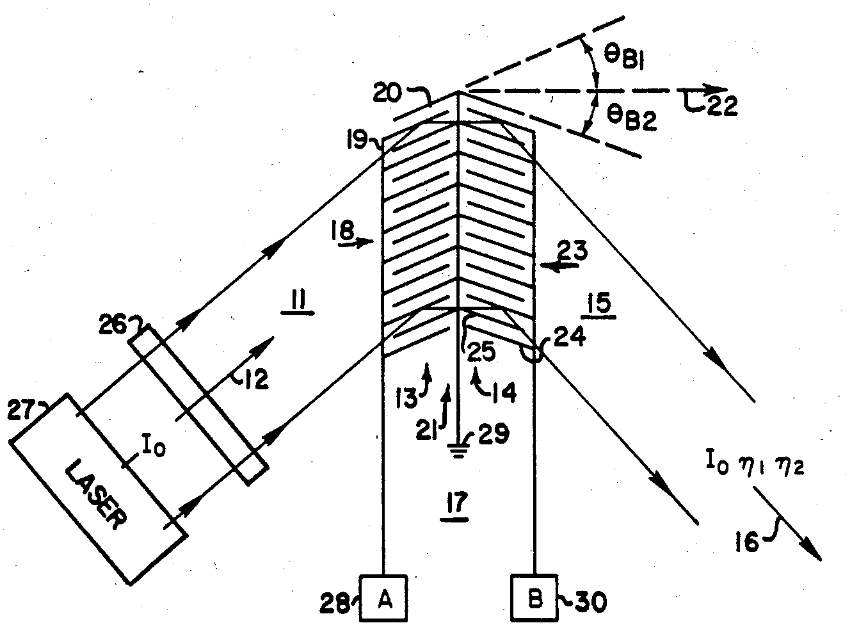
FIG. 2 is a schematic plan view of a typical grating structure, comprising electrodes of the type shown in FIG. 1, for performing multiplication according to the present invention.
Figure 3:
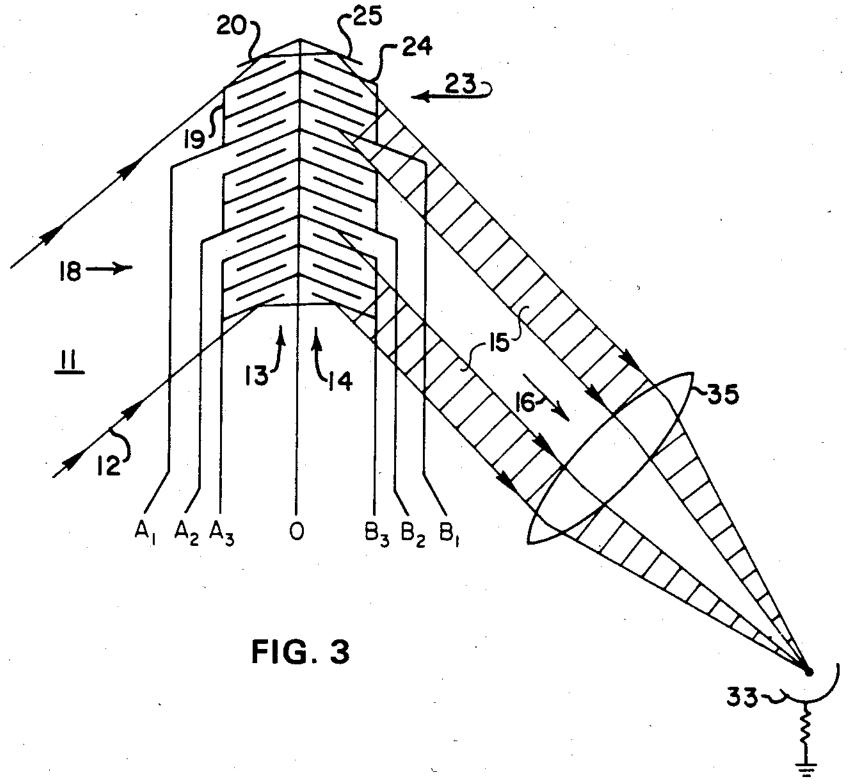
FIG. 3 is a schematic plan view of three grating structures as in FIG. 2, arranged in tandem; with output means for summing three products; according to the invention.

The herringbone structure of FIG. 2 can be used to compute the scalar product of two vectors as shown in FIG. 3. Here the herringbone is segmented, each segment being used to generate the product $A_iB_i$. The products are then summed with the lens to generate the scalar product. This structure and some modifications of it can be used to perform vector-matrix and matrix-matrix multiplication.

Figure 5:
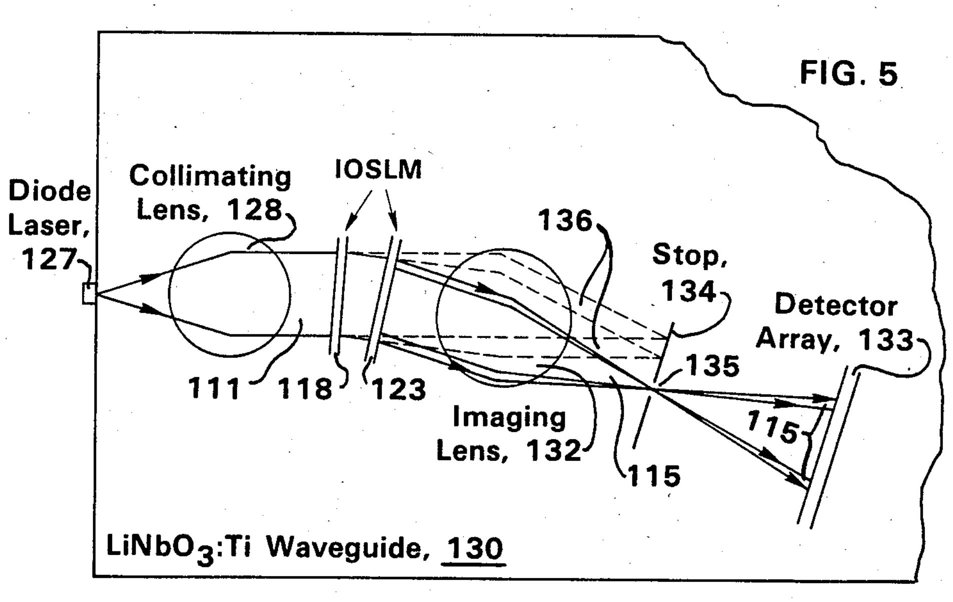
FIG. 5 is a schematic plan view of a typical integrated optical engagement processor in apparatus as in FIG. 4.
Figure 4:
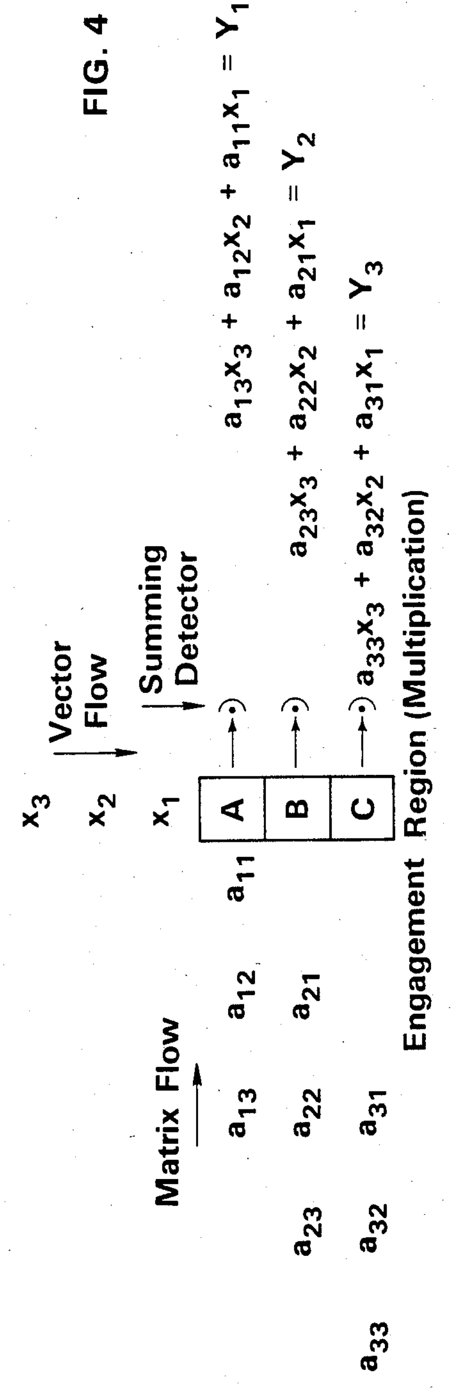
FIG. 4 is a diagram illustrating the flow of inputs and outputs in the engagement region of typical apparatus according to the invention for multiplying a vector by a matrix.

It is possible to compute the product of a matrix and a vector using the segmented herringbone structure along with the engagement architecture shown in FIG. 4. Voltages representing the vector components and the matrix elements are arranged in the sequence indicated in FIG. 4 and synchronously stepped through the engagement region, which is simply the segmented herringbone device. The successive products are accumulated on integrating photodetectors as indicated. A schematic of an IOC for accomplishing this is shown in FIG. 5. A major problem in the practical implementation of this technology is not the fabrication of the IOC, but the design of a suitable electronic drive circuit that neither unduly limits the speed of the optical device nor overwhelms it with the sheer bulk of the electronic hardware.

Figure 6:
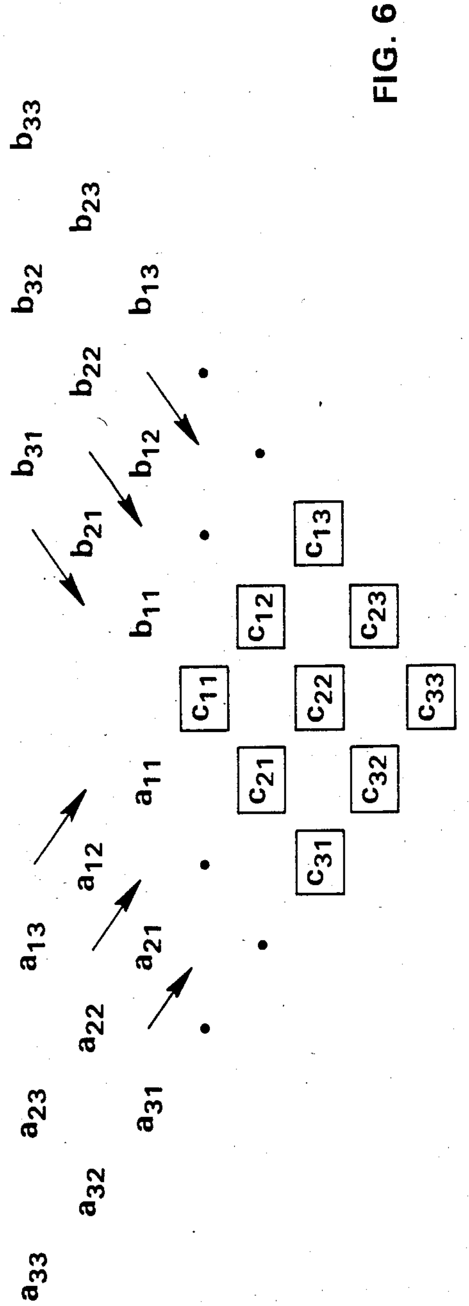
FIG. 6 is a diagram illustrating the flow of inputs and outputs in the engagement region of typical apparatus according to the invention for multiplying a matrix by a matrix.

A systolic approach to matrix-matrix multiplication is shown schematically in FIG. 6. The data flow through the engagment region as indicated, each box in the engagement region being a device that performs a running sum of the products of the respective matrix components, which again are flowing synchronously through the device. Note that in order to obtain proper registration of the elements of the two matrices, the components must enter the engagement region in an appropriately skewed array.

Figure 7:
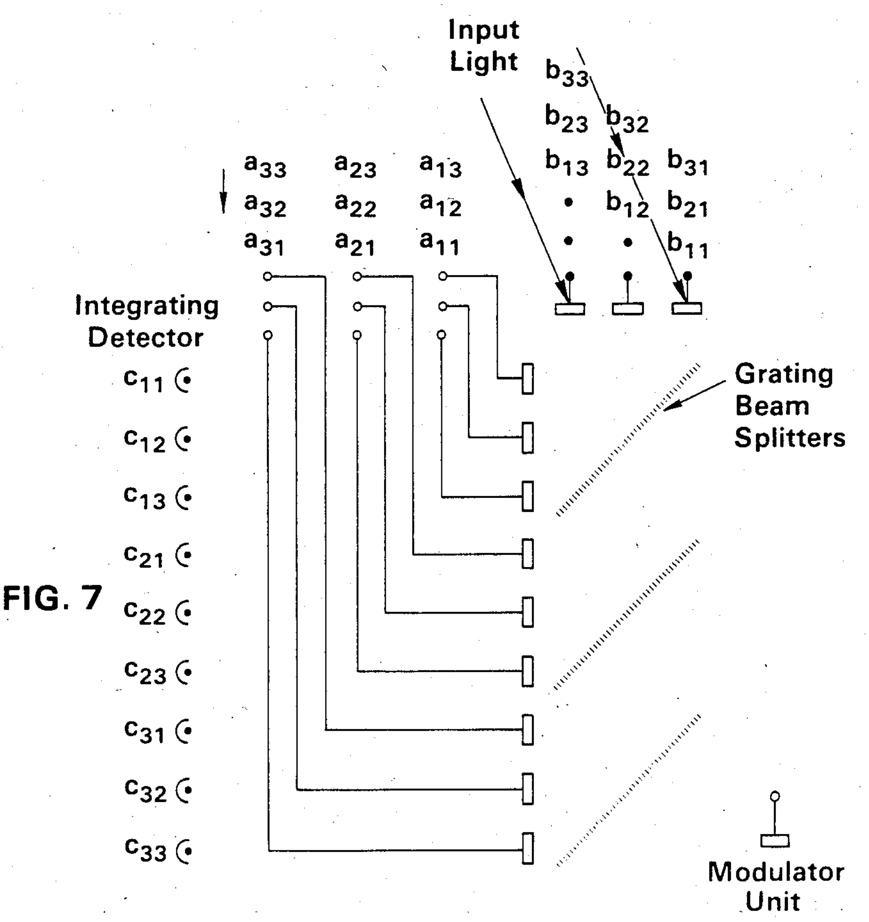
FIG. 7 is a schematic plan view illustrating typical integrated optical embodiments of apparatus as in FIG. 6.

A schematic of an integrated optical circuit for implementing the algorithm of FIG. 6 is shown in FIG. 7, wherein the herringbone structure has been disassembled. A uniform plane guided wave is incident upon $b_{ij}$ modulator units where it has the appropriate intensity modulation impressed upon it. This information is then carried by the light through a series of beam splitters which distribute it to the appropriate $a_{ij}$ modulators. Since the optical distribution of information is essentially instantaneous compared to the rate at which the electronic drive circuitry can shift voltages through the system, we must remove the skew from the A matrix element array to maintain proper synchronism. Once again it appears that the major challenge in the fabrication of a complete matrix-matrix multiplier using these concepts is in the design of high-speed, compact electronic drive circuitry.

A disadvantage of Bragg gratings is their inherent nonlinearity, caused by the dependence of diffraction efficiency on voltage.

The efficiency of an electrooptic grating can be written, at Bragg incidence, as $$\eta=\sin^2\alpha V$$

where $\alpha$ is a constant. This nonlinear response means that some method must be found to produce a voltage from the input variable so that an increment in the input variable produces a proportional increment in $\eta$. Let x denote the input variable. Then, we need to find a voltage V(x) of the form $$V(x) = \sin^{-1}(\sqrt{x})/\alpha$$

This can be done with digital electronics, requiring one circuit for each electrooptic grating. Alternatively, some ac signal processing can be used, but this becomes more and more complicated as the order of the polynomials increases. It appears that the simplest solution is to use an analog electronic circuit to extract the square root of x, and to adjust the operating voltages to remain in the small signal regime. In this case, $$\eta=(\alpha V)^2=x$$

This keeps the circuitry simple, although it leads to a loss of signal-to-noise ratio. If noise becomes a problem, as it may in some large circuits, then the full arcsine function must be used.

The systolic array concept has been most thoroughly discussed by Kung[1] of Carnegie Mellon University. The motivations for this type of computer architecture are:

To avoid the bottleneck caused by repeated reference to memory for the same piece of data.

To minimize fabrication complexity.

These goals are accomplished by the use of computational algorithms in which the computation is carried out while data are flowing through the device after having been introduced only once, and by a device architecture that is based upon the use of a large number of identical units that are connected only to their nearest neighbors.

The specific stystolic array architecture underlying the IOC designs discussed here is the matrix-matrix multiplication architecture illustrated in FIG. 6. The problem is to compute $$\underline{C}=\underline{A}\underline{B}$$

where the ik element of $\underline{C}$ is given by $$C_{ik} = \sum_{i=1}^{N} a_{ij}b_{jk}$$

For 3×3 matrices, for example, $c_{13}$ is $$c_{13}=a_{11}b_{13}+a_{12}b_{23}+a_{13}b_{33}$$

In FIG. 6, the matrix elements $a_{mn}$ and $b_{rs}$ enter the array of computational elements along the diagonals as shown. The motion of the matrix elements is synchronized so that $a_{11}$ and $b_{11}$ enter the box $c_{11}$ simultaneously. Each box multiplies the two simultaneously-incident matrix elements, stores the product and adds it to the product of the next two elements which enter the box. The values of the $a_{mn}$ and $b_{rs}$ are unaltered by these operations and these values (which are the input data) are passed through to the next computational element. It can be seen that, as the data flow through the array, each of the product matrix elements of Equation 2 is generated.

Figure 11:
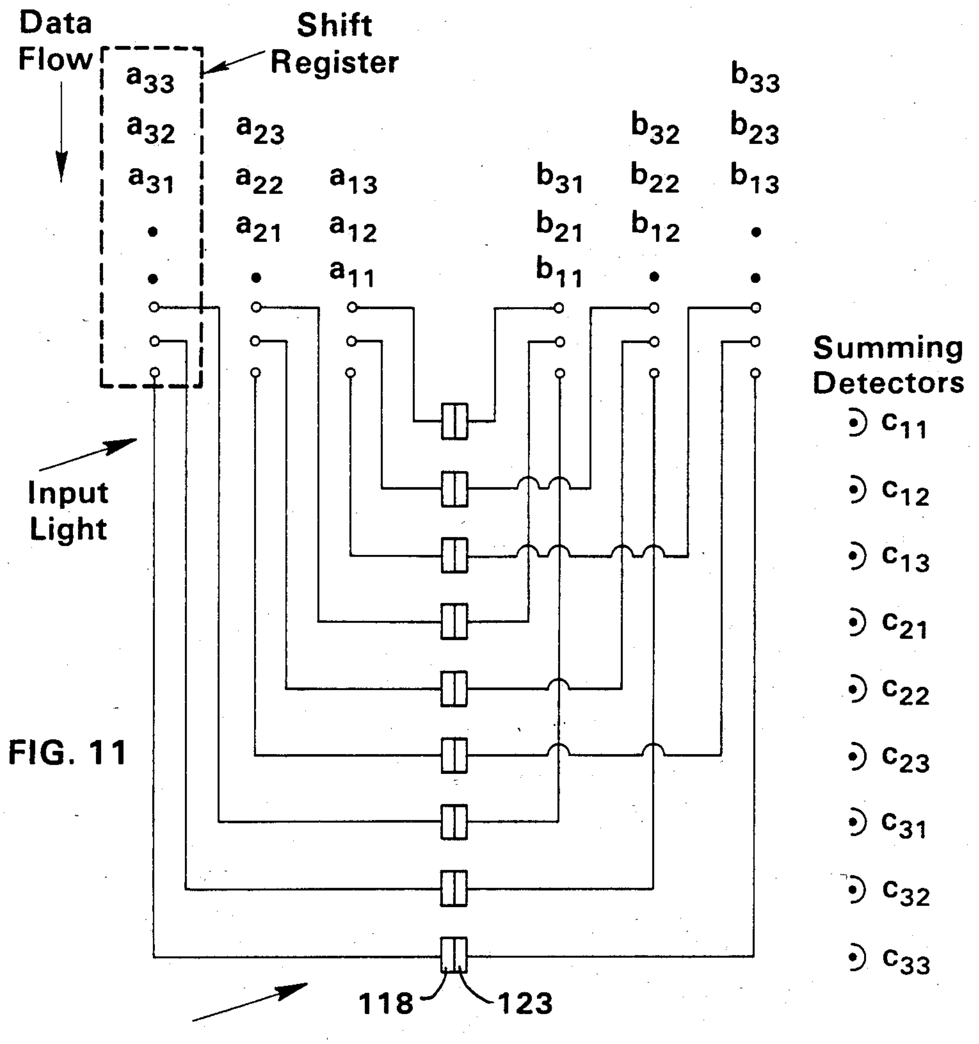
FIG. 11 is a schematic plan view illustrating typical integrated optical embodiments of apparatus as in FIG. 6.

FIG. 11 is a schematic of an IOC for matrix multiplication which is based upon the algorithm depicted in FIG. 6. The computational units are composed of a herringbone electrode structure which performs the multiplication, and a detector with sufficiently long time constant to perform the sums, as in FIGS. 2 and 10.

The intensity of the light diffracted by the herringbone structure is proportional to the product of the two analog voltages applied to the structure. These voltages are stepped through the device in synchronism as indicated in FIG. 11. This may be accomplished using an analog shift register, or with digital shift registers and, for the multiplication of two N by N matrices, $2N^2$ digital to analog (D/A) converters. At this time, the major problems with the IOC of FIG. 11 are the massive amount of high speed electronics required, and the fact that, for the configuration shown, a single IOC with $N^2$ elementary computational units must be employed. The second of these problems is overcome in the device shown in FIG. 7.

Figure 10:
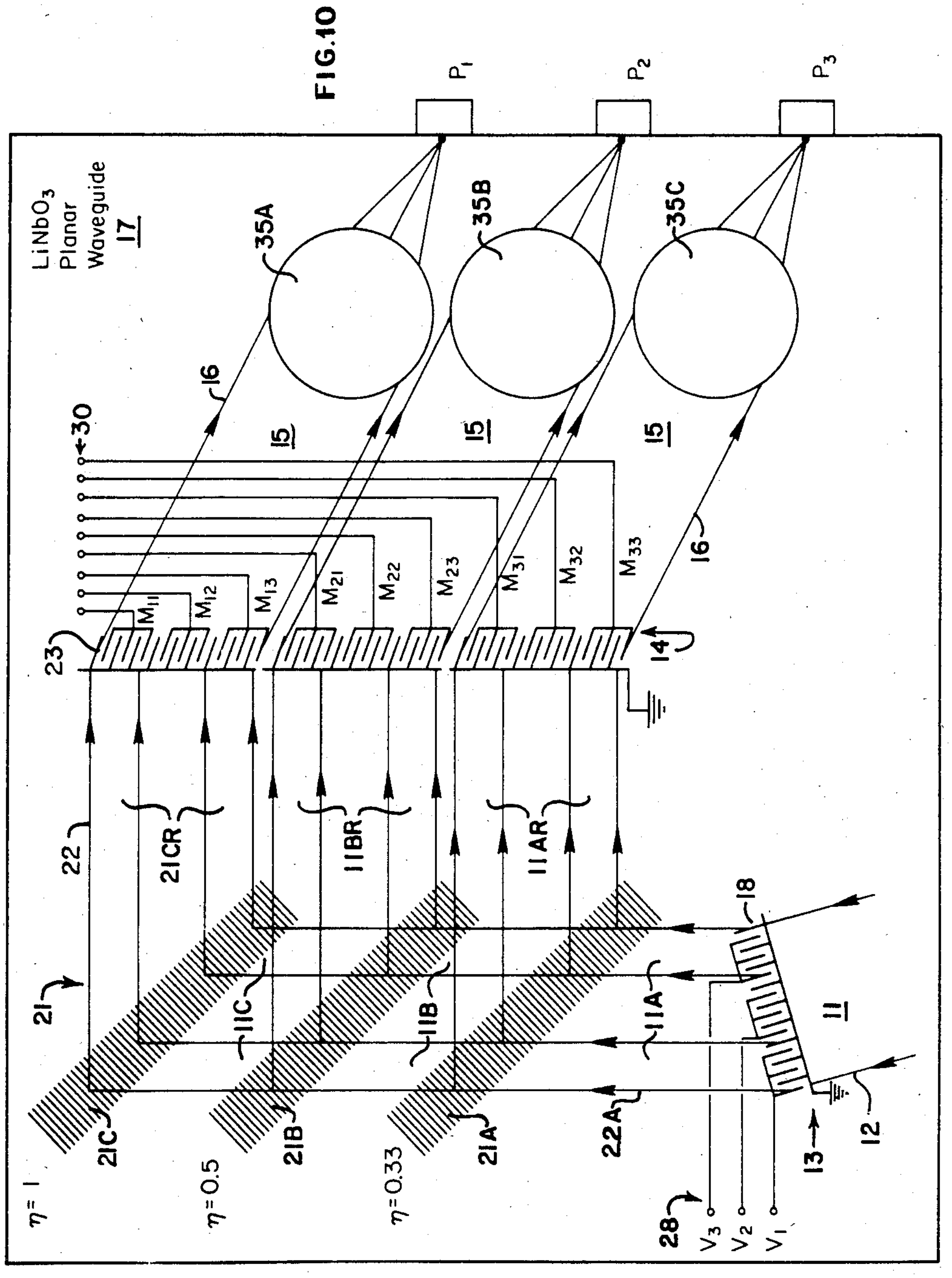
FIG. 10 is a schematic plan view of typical apparatus similar to that of FIG. 7, illustrating details of operation in multiplying a vector by a matrix.

The modified matrix multiplication IOC in FIG. 7 combines some of the features of FIG. 11 with some of the features of the matrix-vector multiplier in FIG. 10. As in the latter device, the herringbone structure has been split into two segments and beam splitters are used to distribute the information encoded in the light beam. The modified matrix multiplication IOC has the following advantages over the device in FIG. 11.

Because the $b_{rs}$ values are distributed optically rather than electronically, the data can, for most cases, be considered to be applied simultaneously to the appropriate $a_{mn}$ electrodes. This allows the $a_{mn}$ matrix element array to advance in a rectangular rather than a skewed array. The result is to reduce the processing time by $N-1$ beats.

The geometry of FIG. 7 suggests that a natural split occurs after each row of $\underline{A}$. Therefore, by using parallel $\underline{B}$ inputs to a number of IOCs, each IOC can calculate one of the row vectors of $\underline{C}$, and these calculations can be done simultaneously.

Using 64 devices as in FIG. 7, one can carry out a $64\times64$ matrix-matrix multiplication. The throughput of the devices is controlled mainly by the rate at which the electrical inputs can be delivered.

The concept of the engagement processor as shown in FIG. 4 involves the coordinated flow of two streams of data that enter an engagement region in which the appropriate computation takes place. The computation illustrated is matrix-vector multiplication. Although the vector components are each used several times to perform the entire multiplication, they pass only once through the processor.

Figure 8:
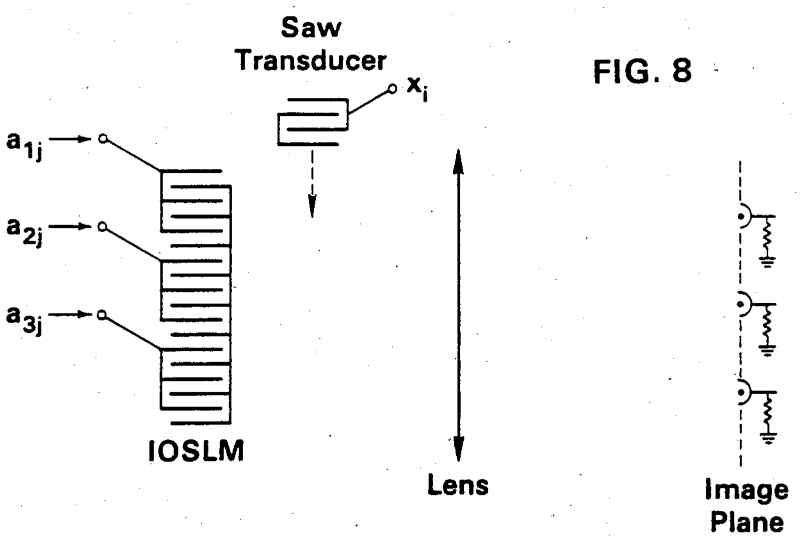
FIG. 8 is a schematic plan view of typical integrated optical apparatus for use in systolic array multiplication.

A number of device designs can be considered for the integrated optical implementation of the engagement processor. The version that most closely follows the geometry of our digital correlator is shown in FIG. 8. Here the matrix elements are introduced in the proper sequence as voltages on the IOSLM, and the vector components are represented as surface acoustic wave intensities. The multiplication takes place by virtue of the fact that the intensity of light emerging from the engagement region is proportional to the product of the IOSLM and the SAW diffraction efficiencies. The engagement region is imaged on a detector array which has a time constant which is chosen to be long enough so that the required summation is performed by the detectors.

The advantage of the configuration of FIG. 8 is that the progress of the vector components through the engagment region is automatic once the appropriate signal has been generated by the SAW transducer. However, there are several disadvantages associated with the use of the SAW to carry data through the processor. First the electronics are complicated by the fact that the clocking rate of matrix components through the IOSLM is determined by the SAW velocity which, in turn, is a function of substrate temperature and of optical waveguide parameters. Second, the output is degraded by the fact that there is only instantaneous alignment between the SAW segments containing the vector components and the various segments of the IOSLM. For the remainder of the time each SAW segment overlaps parts of two adjacent IOSLM segments. The only way to overcome the resultant signal degradation is to pulse the detector or the light source, which causes an additional timing problem and decreases the signal level.

Figure 9:
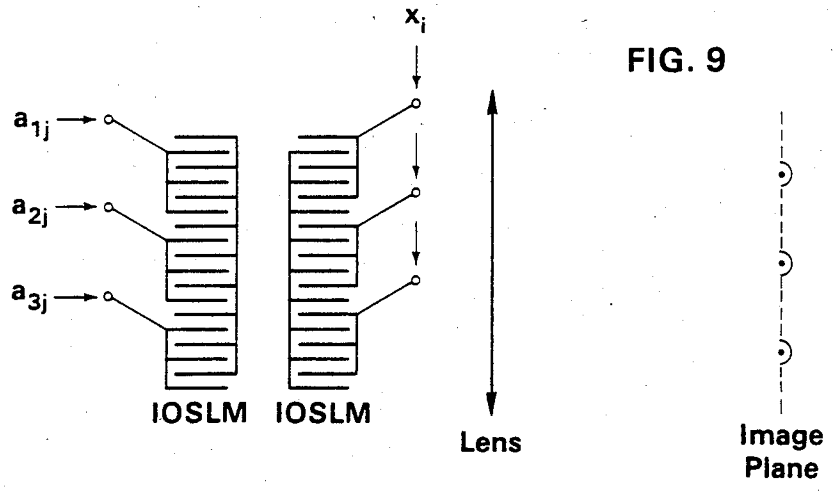
FIG. 9 is a schematic plan view of other typical integrated optical apparatus for use in systolic array processing.

The problems inherent in the design of FIG. 8 are overcome by replacing the SAW transducer with a second IOSLM as shown in FIG. 9. The vector components must now be clocked through the system, but the clock rate is the same as for the matrix components, so synchronism is easily obtained. Furthermore the data rate is no longer tied to the SAW velocity and is limited only by the speed of the input electronics. The intrinsic capacitance of the IOSLM elements is on the order of 10 pf, so the intrinsic IOSLM data rate approaches 1 GHz.

Figure 12:
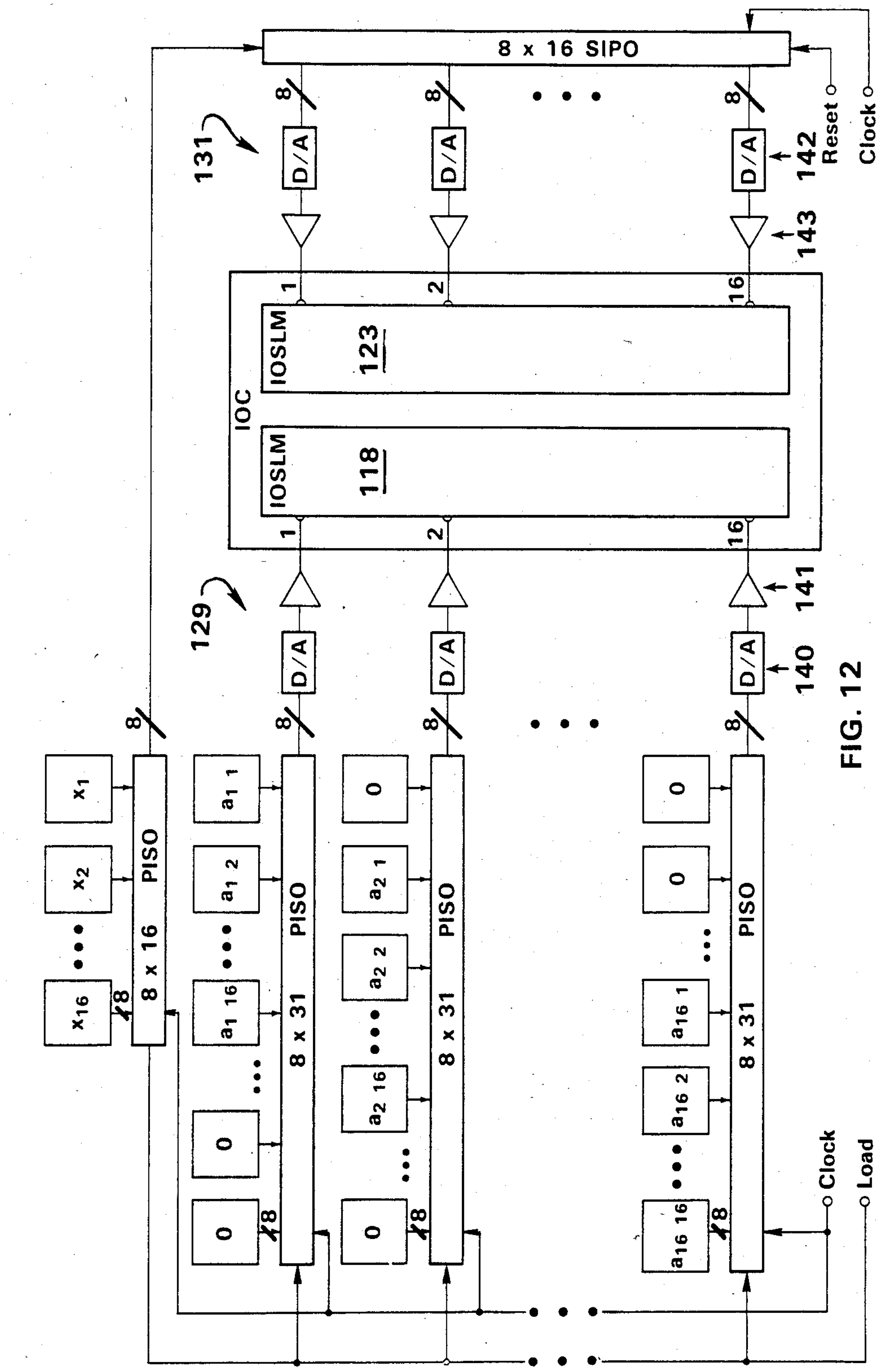
FIG. 12 is a block diagram illustrating typical digital and analog circuitry in apparatus according to the invention for multiplying a matrix by a matrix.

FIG. 12 illustrates typical digital circuitry for multiplying a 16-vector by an arbitrary $16\times16$ matrix. The squares represent the 8-bit numerals, the "a" and "x" values. Typically they comprise registers that are loaded from a digital computer.

The electronic circuitry performs several functions. It interfaces with the signal source which is the origin of the input vectors, conditions the input signals so that they have magnitudes appropriate for driving the IOSLMs, stores the voltages corresponding to the matrix elements, retrieves the matrix elements, and synchronizes their application to the first IOSLM with the progression of the vector components through the second IOSLM.

The herringbone structure shown in FIG. 2 is designed so that light diffracted from the left-hand grating is incident on the right-hand grating at its Bragg angle. The output intensity of the structure is therefore proportional to the product of the diffraction efficiencies of the two gratings. Since the spine of the structure is grounded the first diffraction efficiency $\eta_1$ is proportional to the voltage A and $\eta_2$ is proportional to B. The output of the device is therefore proportional to B. The output of the device is therefore proportional to the product of the two voltages.

As shown in FIG. 3 a lens can be used to sum the outputs of a series of herringbone grating structures. Therefore it is possible to perform vector multiplication.

The operation of matrix-vector multiplication is important in many areas. A variety of optical techniques have been suggested that are capable of high-speed matrix multiplication. In some of these devices the matrix values are stored on a mask which must be physically inserted into the optical system. Changing matrices is therefore an intrinsically slow operation. A modification of the vector multiplication structure shown in FIG. 3 can be used to construct a matrix-vector multiplication IOC in which both the vector and the matrix components can be altered at high speeds by the use of electrical signals. A schematic of this IOC is shown in FIG. 10. The figure shows an IOC for the multiplication of a threedimensional vector by a $3\times3$ matrix. Detailed design studies show that a 16-dimensional device can be fabricated on a 1" square substrate.

To operate the IOC shown in FIG. 10 the voltages corresponding to the three components of the vector are entered on the single IOSLM in the bottom left corner. Light incident on this structure is modulated and passes through three beamsplitters, each one of which directs onethird of the original beam intensity onto what amounts to three copies of the second half of the herringbone electrode structure. Each of these three structures has applied to it voltages corresponding to the components of one row of the matrix. The multiplication and summing operations are accomplished in a manner identical to that of the device shown in FIG. 3. Each of the components of the desired product vector appears at the appropriate output detector P1, P2, P3 in FIG. 10.

Fabrication of the matrix-vector multiplication IOC can be accomplished in three basic steps. The first step is a single photolithographic step to define all of the grating structures. The second and probably most difficult step is the holographic exposure of the surface gratings which act as the beamsplitters. The major difficulty here is to attain the appropriate diffraction efficiencies and also to achieve the proper orientation so that the beams are incident at the Bragg angle on the second grating arrays. The third step is to fabricate the lenses which can be fairly crude $As_2S_3$ Luneburg lenses. The quality of these lenses need not be very high since they merely act as light-gathering elements. They can be easily fabricated in a single step by simultaneous evaporation of $As_2S_3$ through a multiple mask. This device therefore has the advantages of rather simple fabrication and high speed fully programmable operation.

Apparatus according to the present invention typically comprises an electrooptic waveguide upon which is placed a double array of interdigital electrodes similar to the ones shown in the drawings. When any element of this array is actuated by the application of a voltage relative to the center electrode, a phase grating is induced into the waveguide underneath that can efficiently diffract light incident upon it at the correct (Bragg) angle. If the left half of the array is actuated with voltages $V_1, V_2, \ldots$, and the corresponding elements of the array are actuated with voltages $V'_1, V'_2, \ldots$, then light diffracted from the left half of an array element will be rediffracted from the right half of the element. The twice-diffracted light has intensity given by $$I_j = \eta_j \eta'_j I_0$$

for the j-th element, where $I_0$ is the incident intensity, and $\eta_j$, $\eta'_j$ are the efficiencies of the gratings induced by $V_j$ and $V'_j$, respectively. The efficiency of an induced grating is $$\eta = \sin^2(\alpha V)$$

where $\alpha$ is a constant, independent of V, and V is the applied voltage. For small signals, the twice-diffracted beam from element j will have intensity proportional to $V_j^2 \cdot v'^2_j$, so summing over j will give an intensity proportional to the vector product $\vec{P} \cdot \vec{P}'$, the vectors whose components are power stored on the array elements (power stored $= CV^2/2$ where C is the capacitance of the element). If the electrodes are biased to the inflection point of the grating response curve (efficiency-vs-voltage), then the small-signal from an element will be a linear function of the product of the voltages. In this case, the output beam will have a recoverable part whose intensity is proportional to the product of the voltages, and their summation will have a part proportional to the vector product $\vec{V} \cdot \vec{V}'$, where the components are the voltages. This may be a more useful application.

Other typical apparatus according to the invention comprises an arrangement for utilizing an electrooptic vector multiplying element to generate the product of a matrix times a vector. If the matrix is written as the array of its row vectors, $$\overline{\overline{M}} = \vec{M}_1, \vec{M}_2, \ldots \vec{M}_N),$$

then the device generates $$\overline{\overline{M}}\vec{v} = (\vec{M}_1\vec{v}, \vec{M}_2\vec{v}, \vec{M}_3\vec{v}, \ldots, \vec{M}_N\vec{v}).$$

The arrangement produces the terms in this expansion in a unique way by genarating $\vec{v}$ once, then replicating N times, thus reducing the number of connections needed from $2N^2+1$ to $N^2+N+1$ a reduction of $N^2-N$. The indicated summation is performed by a lens.

Referring now to FIGS. 5 and 12, typical apparatus according to the present invention for providing a series of optical analog quantities that are approximately proportional respectively to the components of a third array that is the product of a first array of components multiplied by a second array of components in a predetermined order, comprises means such as a laser 127 and a collimating lens 128 for directing light 111 of selected intensity to the input side of each of a first set of electrooptic modulating means 118 each of whose output light intensity is approximately proportional to a known function of an electrical signal applied to it; means such as the circuitry 129 in FIG. 12 for applying to each of the first set of modulating means 118, while the light 111 is passing through it, a signal approximately proportional to a function of a selected respective component of the first array such that the intensity of the output light from each of the first set of modulating means is approximately proportional to a known function of its selected respective component; means such as the waveguide 130 in FIG. 5 for directing the output light from each of the first set of modulating means 118 to the input side of a respective one of a second set of electrooptic modulating means 123 whose output light intensity is approximately proportional to a known function of an electrical signal applied to it; means such as the circuitry 131 in FIG. 12 for applying to each of the second set of modulating means 123, while the light 111 is passing through it, a signal approximately proportional to a function of a selected respective component of the second array such that the intensity of the output light from each of the second set of modulating means is approximately proportional to a known function of the product of its two selected respective components, means such as an imaging lens 132 for directing the output light 115 from each of the second set of modulating means 123 to a respective means such as a detector in the detector array 133 responsive thereto for providing an electrical signal that is approximately proportional to a known function of the product of its two selected respective components; means such as the circuitry 129,131 for applying, after a predetermined time, to each modulating means in each set 118,123, while the light 111 is passing through it, a signal approximately proportional to a function of another selected respective component of its respective array such that the intensity of the output light from each of the second set of modulating means is approximately proportional to a known function of the product of its two selected respective components; and so on, in the same manner, and finally with the last of the selected respective components of the first array and the last of the selected respective components of the second array, to provide an electrical signal that is approximately proportional to a known function, such as the sum, of the products of each pair of selected respective components; and means such as electrical conductors (not shown) for appropriately directing the individual product signals into a plurality of data processing means each of which provides an output that is approximately proportional to an appropriate component of the product array.

In FIG. 5, an opaque beam stop 134 has an opening at 135 to permit the twice-diffracted output light 115 from the second IOSLM 123 to pass through and on to the detector array 133 while the stop 134 blocks the once-diffracted light and the undiffracted light 136 and thus prevents their reaching the detector array 133.

Typically the first set of modulating means 118 comprises a first plurality of integrated optical spatial light modulators (such as 18 in FIGS. 3 and 10), and the second set of modulating means 123 comprises a second plurality of integrated optical spatial light modulators similar to those in the first set (such as 23 in FIGS. 3 and 10).

Typically the means for applying first signals to the first set of modulating means 118 comprises first means 129 (FIG. 12) for receiving a plurality of electrical signals and for applying them in a predetermined sequence to the first set of modulating means 118. The first signal applying means typically comprises a plurality of digital registers $x_1$, ---$a_{1\,1}$---etc, first means (such as the PISOs) for receiving digital signals from the registers and transmitting them serially to first means (such as the D/A's 140) for converting them to analog signals, and first means (such as the dc amplifiers 141) for applying the analog signals to the first set of modulating means 118. Typically the means for applying second signals to the second set of modulating means comprises second means, (such as the PISO, the SIPO, the D/A's 142, and the dc amplifiers 143) similar to the first, for receiving a plurality of electrical signals $x_1,x_2$,---$x_{16}$ and for applying them in a predetermined sequence to the second set of modulating means 123.

Typically each data processing means comprises means such as the imaging lens 132 in FIG. 5 or the lenses 35A,35B,35C in FIG. 10 for providing an output responsive to the sum of a selected plurality of individual product signals, such as the integrating (summing) detectors or analog charge coupled detectors $C_{11},C_{12}$,---$C_{33}$ in FIGS. 7 and 11, which typically comprise photodetector means and capacitive means for accumulating an electrical charge and thus integrating the output of the photodetector means over an appropriate time.

Referring now especially to FIG. 2, typical apparatus according to the present invention for receiving light 11 entering in a predetermined input direction 12 therein and controlling the directions in which portions of the light travel through regions 13,14 thereof so as to emerge, as at 15, therefrom in a selected output direction 16, with intensity responsive to the product of a plurality of electrical potential differences multiplied together, comprises an electrooptic waveguide 17, first electrooptic reflective means 18, comprising a first electrode 19 and a second electrode 20, on a first region 13 in the waveguide 17, for forming a first Bragg grating 18 in the first region 13 positioned with a direction of Bragg incidence approximately in the predetermined input direction 12, intermediate means 21 for directing light 11 reflected from the first Bragg grating 18 in a predetermined intermediate direction 22 into a second region 14 in the waveguide 17, second electrooptic reflective means 23, comprising a third electrode 24 and a fourth electrode 25, on the second region 14 in the waveguide 17, for forming a second Bragg grating 23 in the second region 14 positioned with a direction of Bragg incidence in approximately the predetermined intermediate direction 22, light input means 26, such as a prism, for directing light 11 of known or controlled intensity (as from a laser 27, or other suitable light source; and collimating means, not shown) to enter approximately in the predetermined input direction 12 into the first electrooptic means 18, first control means 28 for applying a first electrical potential (A in FIG. 2) to the first electrode 19 and a second electrical potential (the ground 29 in FIG. 2) to the second electrode 20, to further direct a portion of the light 11 entering into the first region 13 by providing a first Bragg reflection thereof into the intermediate means 21, and second control means 30 for applying a third electrical potential (B in FIG. 2) to the third electrode 24 and a fourth electrical potential (the ground 29 in FIG. 2) to the fourth electrode 25, to further direct a portion of the light 11 reflected into the second region 14 by providing a second Bragg reflection thereof beyond the second region 14 in the selected output direction 16.

Where the predetermined intermediate direction 22 is approximately the same as a direction of Bragg reflection from the first Bragg grating 18, the intermediate means 21 typically comprises means (merely a portion of the waveguide 17 in FIG. 2) for transmitting light reflected from the first Bragg grating 18 further in approximately the same direction 22 into the second region 14 in the waveguide 17.

Where the predetermined intermediate direction 22 is different from any direction of Bragg reflection (such as 22A in FIG. 5) from the first Bragg grating 18, the intermediate means 21 typically comprises means 21A,21B, 21C for changing the direction of light 11 reflected from the first Bragg grating 18 and directing it in approximately the predetermined intermediate direction 22 into the second region 14 of the waveguide.

The apparatus typically comprises also output means 35,33 (FIG. 3) for receiving the twice-reflected light 15 travelling beyond the second region 14 in the selected output direction 16 and for responding thereto.

As the drawings show schematically, the first electrode 19 typically comprises a first set of substantially straight and parallel, thin, elongate, electrically conductive members connected together at one end, and the second electrode 20 typically comprises a second set of substantially straight and parallel, thin, elongate, electrically conductive members, interleaved with the first set, insulated therefrom, and connected together at the opposite end. Similarly, the third electrode 24 typically comprises a third set of substantially straight and parallel, thin, elongate, electrically conductive members, connected together at one end, and the fourth electrode 25 typically comprises a fourth set of substantially straight and parallel, thin, elongate, electrically conductive members, interleaved with the third set, insultated therefrom, and connected together at the opposite end.

As shown especially in FIG. 2, the third and fourth electrodes 24,25 typically are positioned with their conductive members at an angle from the first and second electrodes 19,20 that is approximately equal to the Bragg angle $\theta B_1$ of the first grating 18 plus the Bragg angle $\theta B_2$ of the second grating 23. Typically the Bragg angle $\theta B_1$ of the first grating 18 is approximately equal to the Bragg angle $\theta B_2$ of the second grating 23. Also the second electrooptic reflective means 23 typically comprises approximately a mirror image of the first electrooptic reflective means 18.

In some typical embodiments, an electrode 20 of the first electrooptic reflective means 18 is connected to an electrode 25 of the second electrooptic reflective means 23, as in FIGS. 2 and 3.

Typical combination apparatus according to the invention may comprise a plurality of individual such apparatuses, each arranged adjacent to and in tandem with another, as in FIGS. 3 and 5. In some typical such embodiments an electrode 20 of the first electrooptic reflective means 18 in each individual apparatus is connected to an electrode 20 of the first electrooptic reflective means 18 in another individual apparatus, and an electrode 25 of the second electrooptic reflective means 23 in each individual apparatus is connected to an electrode 25 of the second electrooptic reflective means 23 in another individual apparatus, as in FIG. 3.

In some typical embodiments of the invention, the first control means 28 comprises means for providing a fixed component of potential difference (such as from a direct voltage source, not shown) between the first and second electrodes 19,20 such as to bias them to a value where the grating response is approximately a linear function of potential difference within a known range, and a variable component of potential difference (such as from a fixed frequency oscillator, amplitude modulated by the desired signal voltage, not shown) within the range of the approximately linear response function; and the second control means 30 also comprises means for providing a fixed component of potential difference between the third and fourth electrodes such as to bias them to a value where the grating response is approximately a linear function of potential difference within a known range, and a variable component of potential difference within the range of the approximately linear response function; whereby the intensity of the light 15 emerging in the selected output direction 16 includes a part that is approximately a linear function of the product of the variable component of potential difference provided by the first control means 28 multiplied by the variable component of potential difference provided by the second cOntrol means 30.

Some such embodiments typically comprise also means 33 for providing an electric signal of amplitude responsive to the intensity of the light 15 emerging in the selected output direction 16, and means (such as a shunting capacitor, not shown) for removing substantially all alternating components from the signal and thus leaving only direct components, which comprise approximately a linear function of the product of the variable component of potential difference provided by the first control means 28 multiplied by the variable component of potential difference provided by the second control means 30. Other such embodiments typically comprise also means 33 for providing an electric signal of amplitude responsive to the intensity of the light 15 emerging in the selected output direction 16, and means (such as a shunting parallel resonant circuit or other suitable bandpass filter, not shown) for removing substantially all components from the signal except the second harmonic alternating component, which comprises approximately a linear function of the product of the variable components of potential difference provided by the first control means 28 multiplied by the variable component of potential difference provided by the second control means 30.

In typical embodiments of the invention for use in digital data processing equipment, the first control means 28 comprises means (such as any suitable binary digital logic circuitry, not shown) for providing selectively either approximately zero potential difference or at least approximately a predetermined finite potential difference between the first and second electrodes 19,20, and the second control means 30 comprises a generally similar type of means for providing selectively either approximately zero potential difference or at least approximately a predetermined finite potential difference between the third and fourth electrodes 24,25; whereby the intensity of the light 15 emerging in the selected output direction 16 at a given instant is either approximately zero or at least approximately a determinable output value, as a digital binary AND function of the potential differences provided by the first and second control means 28,30.

Typical combination analog processing apparatus according to the invention comprises a plurality of individual apparatuses, each arranged adjacent to and in tandem with another, as in FIG. 3, and each first control means 28 typically comprises means for providing a potential difference (such as from an analog electrical voltage source, not shown) within a range wherein the grating response is approximately a quadratic function of potential difference, and each second control means 30 typically comprises a generally similar type of means for providing a potential difference within a range wherein the grating response is approximately a quadratic function of potential difference. Such apparatus typically comprises also output means, such as the lens 35 in FIG. 3, for receiving the twice-reflected light 15 travelling beyond each second region 14 in the selected output direction 16 and directing substantially all of it to means 33 for providing an electric signal of amplitude responsive to the sum of the intensities of the light beams 15 and thus providing an indication responsive to the vector inner product of the squares of the potential differences on the individual first control means 28 and the squares of the potential differences on the respective individual second control means 30.

Other typical, and generally preferred, apparatus according to the invention comprises, in combination, a plurality of individual apparatuses, each operating within the range of its approximately linear response function and tandem with another, as in FIG. 3, and output means, such as the lens 35 in FIG. 3, for receiving the twice-reflected light 15 travelling beyond each second region 14 in the selected output direction 16 and directing substantially all of it to means 33 for providing an electrical signal of amplitude responsive to the intensity of the light 15 and thus providing an indication responsive to the vector inner product of the variable components of the potential differences on the individual first control means 28 and the variable components of the potential differences on the individual second control means 30. In such apparatus, the output means typically comprises means 35 for imaging the output light 15 from the individual apparatuses onto photoelectric means 33, as in FIG. 3.

Typical further combined apparatus according to the invention comprises a plurality of such combinations of individual apparatuses (e.g. a plurality of the combinations shown in FIG. 3), wherein individual potential differences comprising analogs of the individual component values of a selected vector are connected to the same respective first electrooptic reflective means 18 in each such combination of individual apparatuses, and individual potential differences comprising analogs of the individual values in each row of a selected matrix are connected to the same respective second electrooptic reflective means 23 in one such combination, the potential differences for each row of the matrix being connected to a different combination of individual apparatuses from any combination to which the potential differences for any other row are connected, whereby the output of each separate combination of individual apparatuses is an analog of one component value of the vector product of the selected matrix and the selected vector.

Before considering details of the apparatus shown in FIG. 10, it should be noted that it differs from the systolic apparatus of FIG. 7 in that the summing of individual products in FIG. 10 is done in space (by the lenses 35A,35B,35C) rather than in time as in FIG. 7 (by the integrating detectors $C_{11}$, $C_{12}$,- - - $C_{33}$). Of course the operations differ in other ways also, because all of the control voltages to the modulators are applied simultaneously for each vector-by-matrix multiplication in FIG. 10, rather than sequentially as in FIG. 7. The following description while bringing out typical details of the components and their arrangement for multiplication of arrays in both types of apparatus, incidentally exemplifies some of the disadvantages that are overcome by the systolic apparatus of FIGS. 4–9,11, and 12.

The apparatus in FIG. 10, comprises a plurality of individual first electrooptic reflective means 18, each arranged adjacent to and in tandem with another; a like plurality of individual first control means 28 ($V_1$ $V_2$ $V_3$), one for each individual first electrooptic reflective means 18; a first like plurality of individual second electrooptic reflective means 23, one for each first electrooptic reflective means 18, each arranged adjacent to and in tandem with another, to form a first combination of individual second electrooptic reflective means (at $M_{11}$ $M_{12}$ $M_{13}$); a first like plurality of individual second control means 30, one for each individual second reflective means 23 in the first combination thereof, to form a first set of individual second control means ($M_{11}$ $M_{12}$ $M_{13}$); at least one additional like combination of individual second electrooptic reflective means; (FIG. 10 shows two additional combinations, one at $M_{21}$ $M_{22}$ $M_{22}$ $M_{23}$ and another at $M_{31}$ $M_{32}$ $M_{33}$); an additional like set of individual second electrooptic reflective means; (e.g. $M_{21}$ $M_{22}$ $M_{23}$ and $M_{31}$ $M_{32}$ $M_{33}$ in FIG. 10); a plurality of intermediate means 21A, 21B, 21C, one for each combination of individual second electrooptic reflective means, for directing light 11 reflected from each first Bragg grating in the plurality of first electrooptic reflective means 18 in approximately equal portions to the corresponding second Bragg grating in each combination of individual second electrooptic reflective means 23; and a plurality of output means 35A,$P_1$;35B,$P_2$;35C,$P_3$; one for each combination of individual second electrooptic reflective means; each output means comprising means such as a waveguide lens 35A,35B,35C for receiving the light travelling beyond each second electrooptic reflective means 23 in the selected output direction 16 and directing substantially all of it to means such as a photoelectric cell $P_1$,$P_2$, $P_3$ for providing an electric signal of amplitude responsive to the intensity of the light and thus providing an indication that is an analog of one component value of the vector product of a matrix and a vector; where the potential differences provided by the individual first control means $V_1$ $V_2$ $V_3$ comprise analogs of the individual component values of the vector, the potential differences provided by the individual second control means $M_{11}$ $M_{12}$ $M_{13}$ of the first set thereof comprise analogs of the individual values in the first row of the matrix, and the potential differences provided by the individual second control means of each additional set thereof $M_{21}$ $M_{22}$ $M_{23}$ and $M_{31}$ $M_{32}$ $M_{33}$ comprise analogs of the individual values in each respective succeeding row of the matrix.

In such apparatus, typical intermediate means 21 comprise first beam splitting means 21A for receiving light 11A reflected from the plurality of individual first electrooptic reflective means 18 and reflecting approximately 1/n of the light (11AR) to the nth combination of individual second electrooptic reflective means (lower third of FIG. 5) (where n is the number of such combinations) while further transmitting approximately (n−1) /n of the light (11B); second beam splitting means 21B for receiving the light 11B transmitted by the first beam splitting means 21A and reflecting approximately 1/(n−1) of it (11BR) to the (n−1)th combination of individual second electrooptic reflective means (middle third of FIG. 5) while further transmitting approximately (n−2) /(n−1) of it (11C); and so on similarly to the (n−1)th beam splitting means, which reflects approximately ½ (i.e. 1/[n−(n−2)] of the light it receives to the second combination of individual second electrooptic reflective means while further transmitting approximately ½ (i.e [n−(n−1)]/[n−(n−2)] of it to means 21C for directing approximately all (21CR) of the light it receives to the first combination of individual second electrooptic reflective means (upper third of FIG. 5). In FIG. 5, n=3, so the second beam splitting means 21B is the (n−1)th, and thus reflects approximately ½ of the light it receives and futher transmits approximately ½.

In apparatus of the type shown in FIG. 10, each output means typically comprises means 35A, 35B, 35C for imaging the output light 15 from its combination of individual second electrooptic reflective means onto photoelectric means $P_1$ $P_2$ $P_3$.

The following explanation brings out the operating principles of a typical integrated optics device for vector-matrix multiplication, with an analysis of the product-signal extraction therein.

The operation of vector matrix multiplication is of importance in a variety of signal-processing applications. In particular, it has obvious utility in the processing of multispectral-sensor data. We describe here a new concept for an integrated-optical device which performs the vector matrix multiplication operation using electrooptic analog techniques. Because of the analog nature of the device it is exprected to have limited grey-scale resolution (perhaps eight levels). On the other hand the device is expected to be very fast (a complete multipication in less than 10 nsec) and to require signal voltages of less than 10 volts. It can be fabricated so that the matrix is preprogrammed or programmable in real time.

Figure 1:
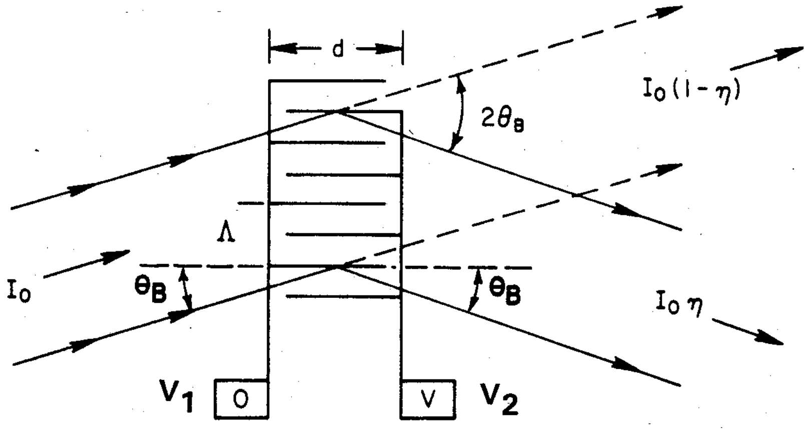
FIG. 1 (PRIOR ART)
FIG. 1 is a schematic plan view of a basic electrode structure, known in the art, for forming a phase grating in an electrooptic waveguide.

The vector-matrix multiplication device which we describe here is a monolithic device which is fabricated upon the surface of a planar electrooptic waveguide. The basic active structure employed in this device is an interdigitated electrode structure such as that shown schematically in FIG. 1. When a voltage V is applied to such a structure, it produces a periodic electric field in the waveguide which, via the electrooptic effect, results in the formation of a phase grating in the waveguide. A guided wave incident upon the grating region at the Bragg angle $\theta_B$, is diffracted by the phase grating. The diffraction efficiency is given by $$\eta = \sin^2 aV \quad (1)$$

where a is a constant which depends upon the electrooptic coefficient, the Bragg angle, the wavelength of the light λ and the grating width. The Bragg angle is defined by $$\sin \theta_B = \lambda/2\Lambda \quad (2)$$

where Λ is the grating spacing.

A modification of the basic grating structure which can be used to perform multiplication is shown in FIG. 2. The central electrode, or "spine", of this structure is at ground potential. The two voltages to be multiplied, A and B, are applied to the left and right outer electrode structures as shown. The intensity of the doubly diffracted beam is $$I = I_o \eta_1 \eta_2 \quad (3)$$

where $\eta_1$ and $\eta_2$ are the diffraction efficiencies of the first and second grating, respectively, and $I_o$ is the incident light intensity. The system is complicated by the fact that the efficiencies are not linearly proportional to the applied voltages. This complication will be dealt with in detail.

For the present, we will assume that a signal proportional to the product AB can be extracted from the output light intensity.

The vector-matrix multiplication which we intend to perform is defined, in three dimensions by $$\overline{\overline{M}} \cdot \vec{V} = \begin{pmatrix} M_{11} & M_{12} & M_{13} \\ M_{21} & M_{22} & M_{23} \\ M_{31} & M_{32} & M_{33} \end{pmatrix} \begin{pmatrix} V_1 \\ V_2 \\ V_3 \end{pmatrix} \quad (4)$$

$$= \begin{pmatrix} M_{11}V_1 & M_{12}V_2 & M_{13}V_3 \\ M_{21}V_1 & M_{22}V_2 & M_{23}V_3 \\ M_{31}V_1 & M_{32}V_2 & M_{33}V_3 \end{pmatrix} = \begin{pmatrix} P_1 \\ P_2 \\ P_3 \end{pmatrix}$$

In Eq. 4 the components of the input bector are represented by $V_i$, the components of the matrix by $M_{ij}$, and the components of the product vector by $P_i$. As can be seen, each $P_i$ is obtained by summing a set of products. The planar optical approach for performing this operation is shown in FIG. 3. The structure of FIG. 2 is segmented so that it can be addressed in three discrete regions. Each of these forms one product $A_iB_i$ and the products are summed by using a lens to collect the light so that it impinges upon a single photodetector. We have thus been able to form one of the quantities $P_i$ of Eq. 4.

There are two approaches to taking the next step, the proper approach being determined largely by the dimensionality of the matrix being considered. If the dimensionality is low, as in the three dimensional case illustrated schematically in FIG. 3, then the matrix-vector multiplier can be fabricated simply by replicating the structure of FIG. 3, three times on the same substrate. In this case the voltages $V_1$, $V_2$, and $V_3$ which represent the vector components must be applied to each of the three structures at the points $A_1$, $A_2$, and $A_3$ respectively. The voltages corresponding to each of the three rows of the matrix will be applied at the points $B_i$ and will be different for each of the three elements. Using this approach there will have to be $2N^2$ (plus grounds) connections to the IOC. In the three dimensional case this amounts to 18+1 connections which is each to accomplish.

Suppose now that we consider the case of an 8×8 matrix. The number of connections now required exceeds 128 and it becomes worthwile to consider methods for reducing this number even at the expense of a more complex fabrication scheme. Since there are $N^2+N$ independent variables in the most general case, it should be possible to eliminate $N^2-N$ connections. One method of accomplishing this is to devise a metallization pattern for connecting in parallel the electrodes corresponding to each of the N vector components. The problem with this approach is suggested in FIG. 11. It is seen that it is impossible to avoid crossings of the leads. In order to prevent shorts, a series of buffer layers would be required. For an N-dimensional matrix, this approach require N photolithographic steps and the deposition of N−1 buffer layers.

A more elegant approach to the problem of reducing the number of connections to the IOC is shown in FIG. 10. Here, the two segments of the basic vector multiplication structure have been separated so that the common vector input can be replicated optically using a series of beam splitters. This process will require only one holographic exposure to form the gratings, but a procedure will have to be developed to produce gratings whose efficiencies vary as shown. We currently favor this method since it requires a much smaller number of fabrication steps than the buffer-layer approach.

A complete IOC for vector-matrix multiplication would include, in addition to the electrode arrays, beam-splitters and lenses shown in FIG. 10, a suitable detector array and a butt-coupled laser diode with an integrated collimating lens. We have carried out preliminary design calculations which indicate that for an 8×8 matrix this entire IOC could fit on a 1½"×2" $LiNbO_3$ slab.

The efficiency of a Bragg grating is $$\eta = \sin^2(\phi) \quad (1)$$

where φ is a phase shift, proportional to the voltage applied across the grating. To use the grating for multiplication it is preferable to have an output which is a linear function of the input voltage rather than a $\sin^2$ function. To derive this desired output we will consider the diffracted intensity from the multiplier when there is a common biasing phase shift (produced by a common bias voltage) applied to the device and the signals are modulated at frequency ω. We will show that, for small signals, the modulation produces terms proportional to the product of the signal voltages.

Let the common biasing phase shift be $\phi_o$ and the signal applied to a grating be $\phi'$. Then, the efficiency in Eq. (1) can be written as $$\eta = \sin^2(\phi_o + \phi') = \sin^2\phi_O + \phi' \sin 2\phi_o + \phi'^2 \cos 2\phi_O - (\tfrac{2}{3})\phi'^3 \sin 2\phi_o + \ldots \quad (2)$$

The ratio of the diffracted intensity to that incident upon the multiplier is the product of two such expressions with signals $\phi'$ and $\phi''$. Denoting this ratio by R, we find $$R = \sin^4\phi_o + (\phi' + \phi'')\sin^2\phi_o \sin 2\phi_o + (\phi'^2 + \phi''^2)\sin^2\phi_o \cos 2\phi_o + \phi'\phi''\sin^2 2\phi_o - \tfrac{2}{3}(\phi'^3 + \phi''^3)\sin^2\phi_o \sin 2\phi_o + (\phi'\phi''^2 + \phi'^2\phi'')\sin 2\phi_o \cos 2\phi_o + \ldots \quad (3)$$

If we now set $\phi_o = \pi/4$, placing the operating point of each grating on the inflection point of the diffraction efficiency curve, then $\sin 2\phi_O = 1$, $\cos 2\phi_O = 0$, and we have $$R = \tfrac{1}{4} + (\phi' + \phi'')/2 + \phi'\phi'' - (\phi'^3 + \phi''^3)/3 + \ldots \quad (4)$$

Now, setting $$\phi' = \phi_1 \sin\omega t$$

$$\phi'' = \phi_2 \sin\omega t \quad (5)$$

we have the expansion $$R = R_{dc} + R_1 \sin\omega t + R_2 \cos 2\omega t + R_3 \sin 3\omega t + \ldots \quad (6)$$

with $$R_{dc} = \tfrac{1}{4} + \phi_1\phi_2/2 \quad (7a)$$

$$R_1 = (\phi_1 + \phi_2)/2 - (\phi_1^{\,3} + \phi_2^{\,3})/4 \quad (7b)$$

$$R_2 = -\phi_1\phi_2/2 \quad (7c)$$

$$R_3 = (\phi_1^{\,3} + \phi_2^{\,3})/12 \quad (7d)$$

Thus, if we detect the dc part of the diffracted signal, we can obtain the product as $$\phi_1\phi_2 = 2R_{dc} - 0.5 \quad (8)$$

In the event that the bias is not precisely $\pi/4$, we incur an error in the product. In this case, we will have instead of Eq. (7a), $$R = \sin^4\phi + (\phi_1^{\,2} + \phi_2)^2 \sin^2\phi_o \cos 2\phi_o/2 + \sin^2 2\phi_o/2 \quad (9)$$

and it is easy to show that if $\phi_o = \pi/4 + \epsilon$, then Eq. (9) is Eq. (7a) plus a term $$\delta R_{dc} = -(1 - (\phi_1^{\,2} + \phi_2^{\,2})/4)\epsilon \quad (10)$$

As might have been expected, this is linear in the phase-bias error.

The following refereces, cited above, are hereby incorporated by reference into this specification, for purposes of indicating the background of the present invention and illustrating the state of the art.

1. H. T. Kung, "Why Systolic Architectures", *Computer,* 15, 37-46 (1982).
2. Toshiaki Suhara, Niroshi Nishihara and Jino Koyama, "High-Efficiency Relief-Type Waveguide Hologram", *Trans. IECE Japan, E*61, 167-170 (1978).
3. T. Kurokawa and S. Oikawa, "Optical Waveguide Ingersections Without Light Leak", *Appl. Opt.,* 16, 1033-1037 (1977); Hirochika Nakajima, Tetsuo Horimatsu, Minoru Seino and Ippei Sawaki, "Crosstalk Characteristics of Ti-LiNbO$_3$ Intersecting Waveguides and Their Application as TE/TM Mode Splitters", *IEEE J. Quantum Electr., QE*-18, 771-776 (1082).
4. Pascal Thiolouse, Alain Carenco and Robert Gugliemi, "High-Speed Modulation of an Electrooptical Directional Coupler", *IEEE J. Quantum Electr.,* QE-17, 535-541 (1981); P. S. Cross and R. V. Schmidt, "A 1 Gbit/s Integrated Optical Modulator", *IEEE J. Quantum Electr.,* QE-15, 1415-1418 (1979).
5. R. V. Schmidt and H. L. Kogelnik, "Electro-Optically Switched Coupler with Stepped $\Delta\beta$ Reversal Using Tri-Diffused LiNbO$_3$ Waveguides", *Appl. Phys. Lett.,* 28, 503-506 (1976).
6. Helge Engan, "Excitation of Elastic Surface Waves by Spatial Harmonics of Interdigital Transducers", *IEEE Trans. on Electron Devices, ED*-16, 1014-1017 (1969).
7. Herwig Kogelnik, "Coupled Wave Theory for Thick Hologram Gratings", *Bell Syst. Tech. J.,* 48, 2909-2947 (1969).
8. H. J. Caulfield, W. T. Rhodes, M. J. Foster, and Sam Horvitz, "Optical Implementation of Systolic Array Processing", *Optics Communications,* 40, 86-90 (Dec. 15, 1981).
9. H. T. Kung and C. E. Leiserson, in Introduction to VLSI, eds. C. A. Mead and L. A. Conway (addison-Wesley, Reading, Mass., 1980).

We now shift our attention from the problem of matrix-vector multiplication to that of matrix-matrix multiplication. This problem is of a higher level of difficulty since, for multiplication of an N×N matrix we now must, in general, generate and keep track of N$^2$, rather than N results to properly formulate the product matrix. The engagement architecture for accomplishing this is shown in FIG. 6. Each of the boxes represents a computational unit which forms the product of simultaneously arriving pairs of voltages and keeps a running sum of these products.

A straightforward adaptation of the architecture to an integrated-optical format is shown in FIG. 11. As can be seen, an N$^2$ element herringbone multiplication unit is employed and (2N−1) clock steps are required to complete the computation. This arrangement also requires 2N$^2$ individual contacts between the IOC and the electrical inputs.

Figure 13:
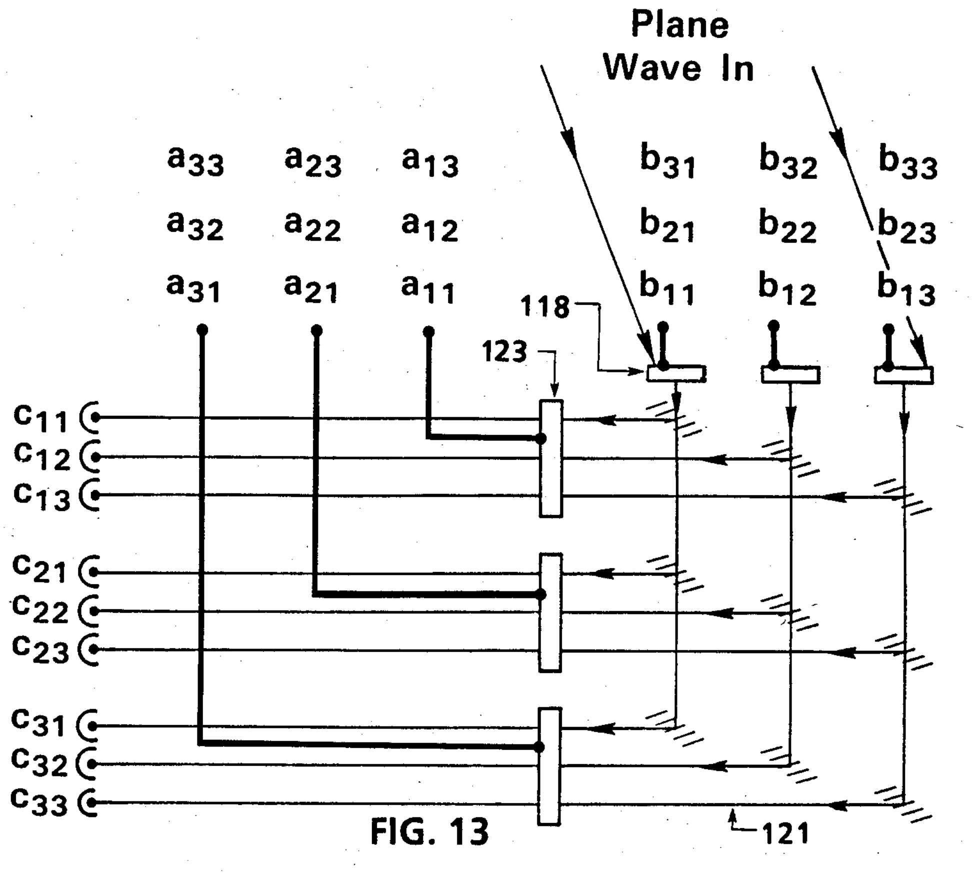
FIG. 13 is a schematic plan view of typical preferred apparatus somewhat as in FIGS. 7 and 11, for multiplying a matrix by a matrix.

The fact that we can use guided waves to distribute information within the processor allows us to make a significant improvement over the design of FIG. 11. This device, which is shown in FIG. 13, is quite similar to the fully parallel matrix-vector multiplier of FIG. 10. However, by rearranging the sequence of the voltages representing the matrix elements as shown in FIG. 13, we can now accomplish an N×N matrix multiplication in only N clock steps. Furthermore, the number of modulator units and the number of electrical connections have been reduced from N$^2$ to 2N, which for large N can be the difference between a feasible and an impossible device. We refer to this arrangement as a compact engagement architecture. The only condition that must be satisfied for the architecture of FIG. 13 to be workable is that the time taken for the $b_{ij}$ information to be optically distributed, typically about 0.2 nsec, is much less than the time between digital clock pulses, which is typically greater than 10 nsec.

Referring now to FIG. 13, in typical apparatus according to the present invention wherein the first array comprises a first matrix, and the second array comprises a second matrix: the first set of electrooptic modulating means comprises a first plurality of integrated optical spatial light modulators 118, one for each column in the first matrix, the means for applying first signals to the first set of modulating means comprises first means for receiving a plurality of signals, one signal for each component in the first matrix, and applying the signal for each component in the first row ($b_{11}$,$b_{12}$, $b_{13}$) substantially simultaneously at a first predetermined time to a different one of the first plurality of modulators 118, then applying the signal for each component in the second row ($b_{21}$,$b_{22}$,$b_{23}$) substantially simultaneously at a second predetermined time to a different one of the first plurality of modulators 118, and so on in the same manner for the other rows in the first matrix, the second set of electrooptic modulating means comprises a second plurality of integrated optical spatial light modulators 123, one for each row in the second matrix, the means for applying second signals to the second set of modulating means 123 comprises second means for receiving a plurality of signals, one signal for each component in the second matrix, and applying the signal for each component in the first column ($a_{11}$,$a_{21}$,$a_{31}$) substantially simultaneously at the first predetermined time to a different one of the second plurality of modulators 123, then applying the signal for each component in the second column ($a_{12}$,$a_{22}$,$a_{32}$) substantially simultaneously at the second predetermined time to a different one of the second plurality of modulators 123, and so on in the same manner for the other columns in the second matrix, the means for directing the output light from the first set of modulating means 118, comprises a plurality of beam splitting means 121, one for each component in the product matrix, arranged so that each beam splitting means 121 in a first set thereof (the left column) directs light from a first one (on the left) of the first plurality of modulators 118 to a different one of the second plurality of modulators 123, each beam splitting means 121 in a second set thereof (the middle column) directs light from a second one (in the middle) of the first plurality of modulators to a different one of the second plurality of modulators 123, and so on in the same manner for the other beam splitting means and the other ones of the first plurality of modulators, the means for directing the output light from each of the second set of modulating means 123 comprises means for directing the light that has been modulated responsive to each combination of first and second signals to the appropriate one ($C_{11}$,$C_{12}$ etc.) of the means responsive thereto for providing an electrical signal that is approximately proportional to a known function of the product of its two respective components ($a_{11}$ $b_{11}$, $a_{21}$ $b_{11}$, etc.), and each data processing means comprises means for adding a combination of products whose sum is a component in the product matrix, typically a summing detector ($c_{11}$,$c_{12}$, etc.) for each component in the product matrix (e.g. $c_{11}=a_{11}b_{11}+a_{12}b_{21}+a_{13}b_{31}$;$c_{12}=a_{11}b_{12}+a_{12}b_{22}+a_{13}b_{32}$; etc.).

Figure 14:
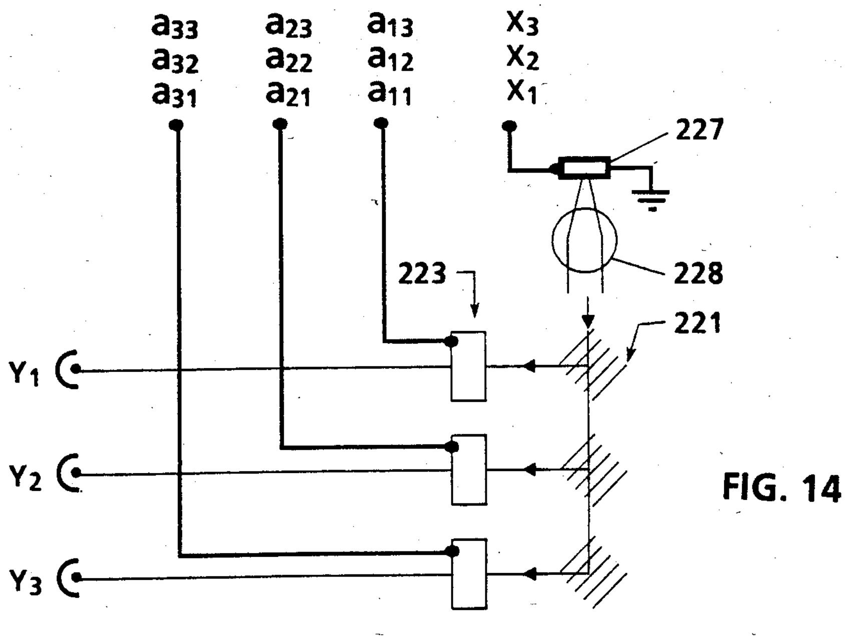
FIG. 14 is a schematic plan view of typical preferred apparatus somewhat as in FIGS. 7, 10, and 11, for multiplying a vector by a matrix.

Referring now to FIG. 14, in typical appratus according to the present invention wherein the first array comprises a vector, and the second array compriseses a matrix: the first set of electrooptic modulating means comprises a first integrated optical spatial light modulator (such as the left modulator 118 in FIG. 13, which may be placed between the collimating lens 228 and the beam splitters 221; and then the voltages $X_1$,$X_2$,$X_3$ may be fed to the modulator 118 instead of to the diode laser 227), the means for applying first signals to the first set of modulating means comprises first means for receiving a plurality of signals, one signal for each component in the vector, and applying the signal for the first component ($X_1$) at a first predetermined time to the first modulator, then applying the signal for the second component ($X_2$) at a second predetermined time to the first modulator, and so on in the same manner for the other components in the vector, the second set of electrooptic modulating means comprises a plurality of second integrated optical spatial light modulators 223, one for each row in the matrix, the means for applying second signals to the second set of modulating means comprises second means for receiving a plurality of signals, one signal for each component in the matrix, and applying the signal for each component in the first column ($a_{11}$, $a_{21}$, $a_{31}$) substantially simultaneously at the first predetermined time to a different one of the plurality of second modulators 223, then applying the signal for each component in the second column substantially simultaneously at a second predetermined time to a different one of the plurality of second modulators 223, and so on in the same manner for the other columns in the matrix, the means for directing the output light from the first set of modulating means comprises a plurality of beam splitting means 221, one for each component in the product matrix, arranged so that each beam splitting means 221 directs light from the first modulator to a different one of the plurality of second modulators, the means for directing the output light from each of the second set of modulating means comprises means for directing the light that has been modulated responsive to each combination of first and second signals to the appropriate one ($y_1$,$y_2$, etc) of the means responsive thereto for providing an electrical signal that is approximately proportional to a known function of the product of its two respective components ($a_{11}x_1$,$a_{21}x_1$, etc.), and each data processing means comprises means for adding a combination of products whose sum is a component in the product matrix, typically a summing detector ($y_1$,$y_2$, etc) for each component in the product matrix (e.g. $y_1=a_{11}x_1+a_{12}x_2+a_{13}x_3$;$y_2+a_{21}x_1+a_{22}x_2+a_{23}x_3$; etc.).

Referring now to FIGS. 5,12,13, and 14, typical apparatus according to the present invention for providing a series of optical analog quantities that are approximately proportional respectively to the components of a third array that is the product of a first array of componts multiplied by a second array of components in a predetermined order, comprises a set of individual means (such as a laser 127,227 and a collimating lens 128,228; either with the laser 227 molulated by the voltages $x_1$,$x_2$, etc as in FIG. 14, or with electrooptic modulating means 118 provided as in FIGS. 5,12, and 13) for providing light and modulating the intensity thereof to be approximately proportional to a known function of an electrical signal applied to the means, means such as the circuitry 129 in FIG. 12 for applying to each of the set of light providing and modulating means (127,128,118 or 227,228) a signal approximately proportional to a function of a selected respective component of the first array such that the intensity of the light from each of the set of light providing and modulating means is approximately proportional to a known function of its selected respective component; means (such as the waveguide 130 in FIG. 5, and beam splitters 121,221 as in FIGS. 13 and 14) for directing the light from each of the set of light providing and modulating means 127,128,118;227,228 to the input side of a respective one of a set of electrooptic modulating means 123;223 whose output light intensity is approximately proportional to a known function of an electrical signal applied to it, means such as the circuitry 131 in FIG. 12 for applying to each of the set of modulating means 123,223, while the light 111 is passing through it, a signal approximately proportional to a function of a selected respective component of the second array such that the intensity of the output light from each of the set of modulating means is approximately proportional to a known function of the product of its two selected respective components, means such as the imaging lens 132 in FIG. 5 for directing the output light 115 from each of the set of modulating means 123,223 to a respective means (such as the photoelectric detectors ($c_{11}$,$c_{12}$, etc in FIG. 13 or the photoelectric detectors $y_1$,$y_2$, etc in FIG. 14) responsive thereto for providing an electrical signal that is approximately proportional to a known function of the product of its two selected respective components; means such as the circuitry 129,131 in FIG. 12 for applying, after a predetermined time, to each light providing and modulating means 127,128,118;227,228, and to each modulating means 123,223 while the light 111 is passing through it, a signal approximately proportional to a function of another selected respective component of its respective array such that the intensity of the output light from each of the set of modulating means 123,223 is approximately proportional to a known function of the product of its two selected respective components; and so on, in the same manner, and finally with the last of the selected respective components of the first array and the last of the selected respective components of the second array, to provide an electrical signal that is approximately proportional to a known function, such as the sum, of the product of each pair of selected respective components; and means such as electrical conductors (not shown) for appropriately directing the individual product signals into a plurality of data processing means each of which provides an output that is approximately proportional to an appropriate component of the product array.

In typical apparatus according to the invention each member of the set of light providing and modulating means comprises a laser 227 and means (such as the voltages $x_1$,$x_2$, etc in FIG. 14) for modulating the intensity of its output light.

In typical appratus as in FIG. 14, the first array comprises a vector, the second array comprises a matrix, and the set of light providing and modulating means 227,228 has only one member. Typically, in such appratus the means for applying first signals to the light providing and modulating means comprises first means for receiving a plurality of signals, one signal for each component in the vector, and applying the signal for the first component $x_1$ at a first predetermined time to the laser 227, then applying the signal for the second component $x_2$ at a second predetermined time to the laser, and so on in the same manner for the other components in the vector, the set of electrooptic modulating means comprises a plurality of integrated optical spatial light modulators 223, one for each row in the matrix, the means for applying second signals to the set of modulating means 223 comprises second means for receiving a plurality of signals, one signal for each component in the matrix, and applying the signal for each component in the first column ($a_{11}$,$a_{21}$,$a_{31}$) substantially simultaneously at the first predetermined time to a different one of the plurality of modulators 223, then applying the signal for each component in the second column ($a_{12}a_{22}$-,$a_{32}$) substantially simultaneously at the second predetermined time to a different one of the plurality of modulators 223, and so on in the same manner for the other columns in the matrix, the means for directing the output light from the light providing and modulating means 227,228 comprises a plurality of beam splitting means 221, one for each component in the product matrix, arranged so that each beam splitting means 221 directs light from the laser 227 to a different one of the plurality of modulators 223, the means for directing the output light from each of the set of modulating means 223 comprises means for directing the light that has been modulated responsive to each combination of first and second signals to the appropriate one ($y_1$,$y_2$, etc.) of the means responsive thereto for providing an electrical signal that is approximately proportional to a known function of the product of its two respective components ($a_{11}x_1$,$a_{21}x_1$, etc.) and each data processing means comprises means for adding a combination of products whose sum is a component in the product matrix, typically a summing detector ($y_1$,$y_2$, etc) for each component in the product matrix (e.g. $y_1=a_{11}x_1+a_{12}x_2+a_{13}x_3$;$y_2=a_{21}x_1+a_{22}x_2+a_{23}x_3$; etc.).

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. Apparatus for providing a series of optical analog intensities that are proportional respectively to the components of a third array that is the product of a first array of components multiplied by a second array of components in a predetermined order, comprising, means for directing light of selected intensity to the input side of each of a first set of electrooptic modulating means each of whose output light intensity is proportional to a know function of an electrical signal applied to it, means for applying to each of the first set of modulating means, while the light is passing through it, a signal proportional to a function of a selected respective component of the first array such that the intensity of the output light from each of the first set of modulating means is proportional to a known function of its selected respective component;

means for directing the output light from each of the first set of modulating means to the input side of a respective one of a second set of electrooptic modulating means whose output light intensity is proportional to a known function of an electrical signal applied to it, means for applying to each of the second set of modulating means, while the light is passing through it, a signal proportional to a function of a selected respective component of the second array such that the intensity of the output light from each of the second set modulating means is proportional to a known function of the product of its two selected respective components, means for directing the output light from each of the second set of modulating means to a respective means responsive thereto for providing an electrical signal that is proportional to a known function of the product of its two selected respective components;

means for applying, after a predetermined time, to each modulating means in each set, while the light is passing through it, a signal proportional to a function of another selected respective component of its respective array such that the intensity of the output light from each of the second set of modulating means is proportional to a known function of the product of its two selected respective components;

and so on, in the same manner, and finally with the last of the selected respective components of the first array and the last of the selected respective components of the second array, to provide an electrical signal that is proportional to a known function of the product of each pair of selected respective components; and means for directing each individual product signal into a predetermined one of a plurality of data processing means each of which provides an output that is proportional to an appropriate component of the third array.

2. Apparatus as in claim 1, wherein the means for directing light to the first set of modulating means comprises a laser and collimating means.

3. Apparatus as in claim 1, wherein the first set of modulating means comprises a first plurality of integrated optical spatial light modulators.

4. Apparatus as in claim 3, wherein the second set of modulating means comprises a second plurality of integrated optical spatial light modulators similar to those in the first set.

5. Apparatus as in claim 1, wherein the means for directing the output light from the first set of modulating means comprises a waveguide.

6. Apparatus as in claim 1, wherein the means for directing the output light from the second set of modulating means comprises an imaging lens.

7. Apparatus as in claim 6, comprising also means for preventing light other than the desired output light from reaching the means responsive thereto.

8. Apparatus as in claim 7, wherein the preventing means comprises opaque blocking means having an opening located to pass only the output light.

9. Apparatus as in claim 1, wherein the means for applying first signals to the first set of modulating means comprises first means for receiving a plurality of electrical signals and for applying them in a predetermined sequence to the first set of modulating means.

10. Apparatus as in claim 9, wherein the first signal applying means comprises a plurality of digital registers, first means for receiving digital signals from the registers and transmitting them serially to first means for converting them to analog signals, and first means for applying the analog signals to the first set of modulating means.

11. Apparatus as in claim 9, wherein the means for applying second signals to the second set of modulating means comprises second means for receiving a plurality of electrical signals and for applying them in a predetermined sequence to the second set of modulating means.

12. Apparatus as in claim 10, wherein the second signal applying means comprises a plurality of digital registers, second means for receiving digital signals from the registers and transmitting them serially to second means for converting them to analog signals, and second means for applying the analog signals to the second set of modulating means.

13. Apparatus as in claim 1, wherein each data processing means comprises means for providing an output responsive to the sum of a selected plurality of individual product signals.

14. Apparatus as in claim 13, wherein each sum responsive means comprises photodetector means and capacitive means for accumulating an electrical charge and thus integrating the output of the photodetector means over an appropriate time.

15. Apparatus as in claim 1, wherein the first array comprises a first matrix, the second array comprises a second matrix, the third array comprises a third matrix, the first set of electrooptic modulating means comprises a first plurality of integrated optical spatial light modulators, one for each row (column) in the first matrix, the means for applying first signals to the first set of modulating means comprises first means for receiving a plurality of signals, one signal for each component in the first matrix, and applying the signal for each component in the first column (row) substantially simultaneously at a first predetermined time to a different one of the first plurality of modulators, then applying the signal for each component in the second column (row) substantially simultaneously at a second predetermined time to a different one of the first plurality of modulators, and so on in the same manner for the other columns (rows) in the first matrix, the second set of electrooptic modulating means comprises a second plurality of integrated optical spatial light modulators, one for each column (row) in the second matrix, the means for applying second signals to the second set of modulating means comprises second means for receiving a plurality of signals, one signal for each component in the second matrix, and applying the signal for each component in the first row (column) substantially simultaneously at the first predetermined time to a different one of the second plurality of modulators, then applying the signal for each component in the second row (column) substantially simultaneously at the second predetermined time to a different one of the second plurality of modulators, and so on in the same manner for the other rows (columns) in the second matrix, the means for directing the output light from the first set of modulating means comprises a plurality of beam splitting means, one for each component in the product matrix, arranged so that each beam splitting means in a first set thereof directs light from a first one of the first plurality of modulators to a different one of the second plurality of modulators, each beam splitting means in a second set thereof directs light from a second one of the first plurality of modulators to a different one of the second plurality of modulators, and so on in the same manner for the other beam splitting means and the other ones of the first plurality of modulators, the means for directing the output light from each of the second set of modulating means comprises means for directing the light that has been modulated responsive to each combination of first and second signals to the appropriate one of the means responsive thereto for providing an electrical signal that is approximately proportional to a known function of the product of its two respective components, and each data processing means comprises means for adding a combination of products whose sum is a component in the third matrix.

16. Apparatus as in claim 15, wherein the data processing means comprises a summing detector for each component in the third matrix.

17. Apparatus as in claim 1, wherein the first array comprises a vector, the second array comprises a matrix, the third array comprises a third matrix, the first set of electrooptic modulating means comprises a first integrated optical spatial light modulator, the means for applying first signals to the first set of modulating means comprises first means for receiving a plurality of signals, one for each component in the vector, and applying the signal for the first component at a first predetermined time to the first modulator, then applying the signal for the second component at a second predetermined time to the first modulator, and so on in the same manner for the other components in the vector, the second set of electrooptic modulating means comprises a plurality of second integrated optical spatial light modulators, one for each column (row) in the matrix, the means for applying second signals to the second set of modulating means comprises second means for receiving a plurality of signals, one for each component in the matrix, and applying the signal for each component in the first row (column) substantially simultaneously at the first predeterimed time to a different one of the plurality of second modulators, then applying the signal for each component in the second row (column) substantially simultaneously at the second predetermined time to a different one of the plurality of second modulators, and so on in the same manner for the other rows (columns) in the matrix, the means for directing the output light from the first set of modulating means comprises a plurality of beam splitting means, one for each component in the product matrix, arranged so that each beam splitting means directs light from the first modulator to a different one of the plurality of second modulators, the means for directing the output light from each of the second set of modulating means comprises means for directing the light that has been modulated responsive to each combination of first and second signals to the appropriate one of the means responsive thereto for providing an electrical signal that is approximately proportional to a known function of the product of its two respective components, and each data processing means comprises means for adding a combination of products whose sum is a component in the third array.

18. Apparatus as in claim 17, wherein the data processing means comprises a summing detector for each component in the product matrix.

19. A method for providing a series of optical analog intensities that are proportional respectively to the components of a third array that is the product of a first array of components multiplied by a second array of components in a predetermined order, comprising, directing light of selected intensity to the input side of each of a first set of modulating means each of whose output light intensity is proportional to a known function of an electrical signal applied to it, applying to each of the first set of modulating means, while the light is passing through it, a signal proportional to a function of a selected respective component of the first array such that the intensity of the output light from each of the first set of modulating means is proportional to a known function of its selected respective component;

directing the output light from each of the first set of modulating means to the input side of a respective one of a second set of modulating means whose output light intensity is proportional to a known function of an electrical signal applied to it, applying to each of the second set of modulating means, while the light is passing through it, a signal proportional to a function of a selected respective component of the second array such that the intensity of the output light from each of the second set of modulating means is proportional to a known function of the product of its two selected respective components, directing the output light from each of the second set of modulating means to a respective means responsive thereto for providing an electrical signal that is proportional to a known function of the product of its two selected respective components;

then, after a predetermined time, applying to each modulating means in each set, while the light is passing through it, a signal proportional to a function of another selected respective component of its respective array such that the intensity of the output light from each of the second set of modulating means is proportional to a known function of the product of its two selected respective components;

and so on, in the same manner, and finally with the last of the selected respective components of the first array and the last of the selected respective components of the second array, to provide an electrical signal that is proportional to a known function of the product of each pair of selected respective components, and directing each individual product signal into a predetermined one of a plurality of data processing means each of which provides an output that is proportional to an appropriate component of the third array.

20. Apparatus for providing a series of optical analog intensities that are proportional respectively to the components of a third array that is the product of a first array of components multiplied by a second array of components in a predetermined order, comprising, a set of individual means for providing light and modulating the intensity thereof to be proportional to a know function of an electrical signal applied to the means, means for applying to each of the set of light providing and modulating means, a signal proportional to a function of a selected respective component of the first array such that the intensity of the light from each of the set of light providing and modulating means is proportional to a known function of its selected respective component;

means for directing the light from each of the set of light providing and modulating means to the input side of a respective one of a set of electrooptic modulating means whose output light intensity is proportional to a known function of an electrical signal applied to it, means for applying to each of the set of modulating means, while the light is passing through it, a signal proportional to a function of a selected respective component of the second array such that the intensity of the output light from each of the set of modulating means is proportional to a known function of the product of its two selected respective components, means for directing the output light from each of the set of modulating means to a respective means responsive thereto for providing an electrical signal that is proportional to a known function of the product of its two selected respective components;

means for applying, after a predetermined time, to each light providing and modulating means, and to each modulating means while the light is passing through it, a signal proportional to a function of another selected respective component of its respective array such that the intensity of the output light from each of the set of modulating means is proportional to a known function of the product of its two selected respective components;

and so on, in the same manner, and finally with the last of the selected respective components of the first array and the last of the selected respective components of the second array, to provide an electrical signal that is proportional to a known function of the product of each pair of selected respective components; and means for directing each individual product signal into a predetermined one of a plurality of data processing means each of which provides an output that is proportional to an appropriate component of the third array.

21. Apparatus as in claim 20, wherein each member of the set of light providing and modulating means comprises a laser and means for modulating the intensity of its output light.

22. Apparatus as in claim 25, wherein the first array comprises a vector, the second array comprises a matrix, and the set of light providing and modulating means has only one member.

23. Apparatus as in claim 22, wherein the means for applying first signals to the light providing and modulating means comprises first means for receiving a plurality of signals, one for each component in the vector, and applying the signal for the first component at a first predetermined time to the laser, then applying the signal for the second component at a second predetermined time to the laser, and so on in the same manner for the other components in the vector, the set of electrooptic modulating means comprises a plurality of integrated optical spatial light modulators, one for each column (row) in the matrix, the means for applying second signals to the set of modulating means comprises second means for receiving a plurality of signals, one for each component in the matrix, and applying the signal for each component in the first row (column) substantially simultaneously at the first predetermined time to a different one of the plurality of modulators, then applying the signal for each component in the second row (column) substanially simultaneously at the second predetermined time to a different one of the plurality of modulators, and so on in the same manner for the other rows (columns) in the matrix, the means for directing the output light from the light providing and modulating means comprises a plurality of beam splitting means, one for each component in the product matrix, arranged so that each beam splitting means directs light from the laser to a different one of the plurality of modulators, the means for directing the output light from each of the set of modulating means comprises means for directing the light that has been modulated responsive to each combination of first and second signals to the appropriate one of the means responsive thereto for providing an electrical signal that is approximately proportional to a known function of the product of its two respective components, and each data processing means comprises means for adding a combination of products whose sum is a component in the third array.

24. Apparatus as in claim 23, wherein the data processing means comprises a summing detector for each component in the third array.

* * * * *